United States Patent
De Bellis

(10) Patent No.: US 10,402,456 B2
(45) Date of Patent: Sep. 3, 2019

(54) DATABASE OPERATIONS AND DATA MANIPULATION USING SEARCH-ON-THE-FLY

(71) Applicant: Joseph L. De Bellis, Southampton, NY (US)

(72) Inventor: Joseph L. De Bellis, Southampton, NY (US)

(73) Assignee: VILOX TECHNOLOGIES, LLC, Plano, TX (US)

(*) Notice: Subject to any disclaimer, the term of this patent is extended or adjusted under 35 U.S.C. 154(b) by 1061 days.

(21) Appl. No.: 14/214,700

(22) Filed: Mar. 15, 2014

(65) Prior Publication Data

US 2014/0280004 A1 Sep. 18, 2014

Related U.S. Application Data

(60) Continuation-in-part of application No. 11/979,255, filed on Oct. 31, 2007, now Pat. No. 10,002,167, which is a continuation of application No. 10/871,050, filed on Jun. 21, 2004, now Pat. No. 7,574,432, which is a division of application No. 09/513,340, filed on Feb. 25, 2000, now Pat. No. 6,760,720.

(60) Provisional application No. 61/852,024, filed on Mar. 15, 2013.

(51) Int. Cl.
*G06F 16/951* (2019.01)
*G06F 3/00* (2006.01)

(52) U.S. Cl.
CPC .............. *G06F 16/951* (2019.01); *G06F 3/00* (2013.01)

(58) Field of Classification Search
None
See application file for complete search history.

(56) References Cited

U.S. PATENT DOCUMENTS

| | | | | |
|---|---|---|---|---|
| 5,428,735 | A * | 6/1995 | Kahl | G06F 3/0481 707/999.004 |
| 5,966,126 | A * | 10/1999 | Szabo | G06F 16/2428 715/762 |
| 2002/0046209 | A1* | 4/2002 | De Bellis | G06F 17/30392 |
| 2004/0073565 | A1* | 4/2004 | Kaufman | G06F 17/30572 |
| 2008/0059445 | A1* | 3/2008 | De Bellis | G06F 17/30392 |

* cited by examiner

*Primary Examiner* — Pierre M Vital
*Assistant Examiner* — Alicia M Antoine

(57) ABSTRACT

A data search and manipulation method includes accessing, by a processor, a first data element of a first data structure, the first data structure represented by a first icon, the first icon displayed in a user interface; accessing, by the processor, a second data element of a second data structure, the second data structure represented by a second icon displayed in the user interface; executing, by the processor, a first data manipulation process in response to the first icon dragged over the second icon; and executing, by the processor, a second data manipulation process in response to the second icon dragged over the first icon.

20 Claims, 27 Drawing Sheets

FIG. 30

| MDI Form1 | | |
|---|---|---|
| S.O.F | | |
| | Attorney | |
| | Minami International Corp. (New York, NY) | Minnesota Mining and Manufacturing Company (St Paul) |
| | Minato Medical Science. Co., Ltd (Osaka, JA) | Minnesota Mining and Manufacturing Company (St Paul) |
| | Minatur Promotions and Enterprises, Ltd. (Chicago) | Minnesota Mining and Manufacturing Company (St Paul) |
| | MSIC Incorporated (Colorado Springs. CO) | Minnesota Mining and Manufacturing Company (St Paul) |
| | Minchom Magnetic Systems Limited (London, EN) | Minnesota Mining and Manufacturing Company (St Paul) |
| | Mind Center Corporation (Pato Alto,CA) | Minnesota Mining and Manufacturing Company (St Paul) |
| | Mine Safety Appliances Company (Pittsburgh, PA) | Minnesota Mining and Manufacturing Company (St Paul) |
| | Minebee Co., Ltd (Negerio, JP) | Minnesota Mining and Manufacturing Company (St Paul) |
| | Minetab Electronic Industries Ltd. (Adelade, AU) | Minnesota Mining and Manufacturing Company (St Paul) |
| | Minell AG (CH) | Minnesota Mining and Manufacturing Company (St Paul) |
| | Miner Elastomer Products Corporation (Geneve,IL) | Minnesota Scientific, Inc, |
| | Miner Enterprises, Inc. (Chicago, IL) | Minnesota Scientific, Inc, |
| | Miner Enterprises, Inc. (Geneva, IL) | Minnesota Valley Engineering, Inc |
| | Mineral Fiber Manufactering Corporation | Minntech. Corpation |
| | Mineral Recovery Corporation (Pleasantville, NY) | Mino Yogyo Co Ltd. |
| | Mineral Research & Development Corporation | Minolta Camera Co., Ltd |
| | Minerals Research Corporation(Oregon, UT) | Minolta Camera Co., Ltd |
| | Minereo Corporation (New York, NY) | Minolta Camera Co., Ltd |
| | Mines de Potasae d' Altace S.A. | Minolta Camera Co., Ltd |
| | Ming Tey Hardware Ind. Co., Ltd. | Minolta Camera Co., Ltd |
| | Minigrio, Inc, | Minolta Camera Co., Ltd |
| | Minigrio, Inc; | Minolta Camera Co., Ltd |
| | Minnerd Technologies | Minolta Camera Co., Ltd |
| | Mining Equipment Division | Minolta Camera Co., Ltd |
| | Mining Equipment Division | Minolta Camera Co., Ltd |
| | Mining Equipment Division of FMC | Minolta Camera Co., Ltd |
| | Minnesota Mining & Manufacturing Company (MN) | View By... |

ViewBY — Attorney
Title
Parent Number
Inventor Name
Inventor Locatio
US References
Foreign Referen
US Classes
International Cla
Application Num
Application Date
Issue Date
Primary Examin

FIG. 31

DATABASE OPERATIONS AND DATA MANIPULATION USING SEARCH-ON-THE-FLY

RELATED APPLICATIONS

This patent application claims the benefit of provisional patent application Ser. No. 61/852,024 filed Mar. 15, 2013 entitled Database Operations and Data Manipulation Using Search-On-The-Fly, which is a continuation-in-part of U.S. patent application Ser. No. 11/979,255 entitled Search-On-The-Fly Search Engine, filed Oct. 31, 2007, which is a continuation of U.S. patent application Ser. No. 10/871,050, filed Jun. 21, 2004 entitled Search-On-The-Fly/Sort-On-The-Fly Search Engine, now U.S. Pat. No. 7,574,432, which is a division of U.S. patent application Ser. No. 09/513,340, filed Feb. 25, 2000, entitled Search-On-The-Fly/Sort-On-The-Fly Search Engine for Searching Databases, now U.S. Pat. No. 6,760,720. The disclosures of these patent applications and patents are hereby incorporated by reference in their entirety.

BACKGROUND

In the most general sense, a database is a collection of data. Various architectures have been devised to organize data in a computerized database. Typically, a computerized database includes data stored in mass storage devices, such as tape drives, magnetic hard disk drives and optical drives. Three main database architectures are termed hierarchical, network and relational. A hierarchical database assigns different data types to different levels of the hierarchy. Links between data items on one level and data items on a different level are simple and direct. However, a single data item can appear multiple times in a hierarchical database and this creates data redundancy. To eliminate data redundancy, a network database stores data in nodes having direct access to any other node in the database. There is no need to duplicate data since all nodes are universally accessible. In a relational database, the basic unit of data is a relation. A relation corresponds to a table having rows, with each row called a tuple, and columns, with each column called an attribute. From a practical standpoint, rows represent records of related data and columns identify individual data elements. The order in which the rows and columns appear in a table has no significance. In a relational database, one can add a new column to a table without having to modify older applications that access other columns in the table. Relational databases thus provide flexibility to accommodate changing needs.

All databases require a consistent structure, termed a schema, to organize and manage the information. In a relational database, the schema is a collection of tables. Similarly, for each table, there is generally one schema to which it belongs. Once the schema is designed, a tool, known as a database management system (DBMS), is used to build the database and to operate on data within the database. The DBMS stores, retrieves and modifies data associated with the database. Lastly, to the extent possible, the DBMS protects data from corruption and unauthorized access.

A human user controls the DBMS by providing a sequence of commands selected from a data sublanguage. The syntax of data sublanguages varies widely. The American National Standards Institute (ANSI) and the International Organization for Standardization (ISO) have adopted Structured English Query Language (SQL) as a standard data sublanguage for relational databases. SQL comprises a data definition language (DDL), a data manipulation language (DML), and a data control language (DCL). The DDL allows users to define a database, to modify its structure and to destroy it. The DML provides the tools to enter, modify and extract data from the database. The DCL provides tools to protect data from corruption and unauthorized access. Although SQL is standardized, most implementations of the ANSI standard have subtle differences. Nonetheless, the standardization of SQL has greatly increased the utility of relational databases for many applications.

Although access to relational databases is facilitated by standard data sublanguages, users still must have detailed knowledge of the schema to obtain needed information from a database since one can design many different schemas to represent the storage of a given collection of information. For example, in an electronic commerce system, product information, such as product SKU, product name, product description, price, and tax code, may be stored in a single table within a relational database. In another electronic commerce system, product SKU, product name, description, and tax code may be stored in one table while product SKU and product price are stored in a separate table. In this situation, a SQL query designed to retrieve a product price from a database of the first electronic commerce system is not useful for retrieving the price for the same product in the other electronic system's database because the differences in schemas require the use of different SQL queries to retrieve product price. As a consequence, developers of retail applications accessing product information from relational databases may have to adapt their SQL queries to each individual schema. This, in turn, prevents their applications from being used in environments where there are a wide variety of databases having different schemas, such as the World Wide Web.

A further problem with conventional searches, search engines, data access and data retrieval is a tendency to return very large amounts of data, or to require the search parameters to be narrowed. When large amounts of data are presented, the display may take many "pages" before all data is seen by the user. The time and expense involved in such a data review may be significant, inconvenient, not user friendly or efficient.

SUMMARY

Sort-on-the-Fly/Search-on-the-Fly data retrieval methods and apparatus (hereafter, search-on-the-fly) provide an intuitive means for accessing or searching databases, allowing a user to access or obtain information about data in the database without having to know anything about the database structure. Sort-on-the-Fly/Search-on-the-Fly is an information gathering process or analysis process about data stored in one or more databases. The on-the-fly methods and apparatus often use or include sorting and searching. While Sort-on-the-Fly/Search-on-the-Fly may be a search engine or part of a search engine, it may also stand alone or make calls to a search engine. For example, database search engines may be used in conjunction with on-the-fly methods and apparatus.

Using Sort-on-the-Fly/Search-on-the-Fly, a user selects a desired term, and the user is delivered all instances of the desired term, even if a specific file or table does not contain the instance. For example, if a user wants to enter a database using the name of a specific individual as a database entry point, a database manager or other software will access the database using the desired name, and will organize the results so that all entries associated with that name are displayed. The database need not have a specific file (in a flat database) or a table (in a relational database) of names. The user may perform further on-the-fly searches or information retrieval to narrow or focus the results, or for other reasons. For example, given results for all names that include the name "Smith," the user may then decide to obtain information for all "Smiths" that include an association to an address in New Jersey. Search-on-the-fly then conducts a further information gathering using these criteria and produces a second result. Further narrowing or broadening of the analysis is permitted, with search-on-the-fly returning results based on any new criteria.

In an embodiment, search-on-the-fly uses graphical user interfaces (GUIs) and one or more icons to make the information gathering process as efficient as possible. The GUIs may incorporate one or more pull down menus of available sorting terms. As a user selects an item from a first pulldown menu, a subsequent pulldown menu displays choices that are available for sorting or searching. The process may be continued or repeated until Sort-on-the-Fly/Search-on-the-Fly has retrieved or displayed a discrete data entry from the database. The pulldown menus are not pre-formatted. Instead, the pulldown menus are created "on-the-fly" as the user steps through the sort and/or search process. Thus, search-on-the-fly is inherently intuitive, and allows a user with little or no knowledge of the database contents, its organization, or a search engine search routine to execute comprehensive analysis, sorting and/or searches that return generally accurate results.

A data search and manipulation method includes accessing, by a processor, a first data element of a first data structure, the first data structure represented by a first icon, the first icon displayed in a user interface; accessing, by the processor, a second data element of a second data structure, the second data structure represented by a second icon displayed in the user interface; executing, by the processor, a first data manipulation process in response to the first icon dragged over the second icon; and executing, by the processor, a second data manipulation process in response to the second icon dragged over the first icon.

A method for searching data in a first database represented by a first icon and a second database represented by a second icon includes receiving a search request for a data element in the first database; returning the data element; responding to a first manipulation of the first and second icons, includes detecting a first move of the first icon over the second icon, identifying the first move as a first search request, the processor executing a first search operation in response to the first search request, and providing a first search result. The method further includes responding to a second manipulation of the first and second icons, including detecting a second move of the second icon over the first icon, identifying the second move as a second search request, the processor executing a second search operation in response to the second search request, and providing a second search result different from the first search result.

A system for searching and manipulating data, the data in a first database represented by a first icon and a second database represented by a second icon, includes a processor; and a computer-readable storage medium containing search-on-the-fly search and data manipulation instructions. The processor executes the instructions to receive a search request for a data element in the first database and return the data element. The processor responds to a first manipulation of the first and second icons. The processor detects a first move of the first icon over the second icon, identifies the first move as a first search request, executes a first search operation in response to the first search request, and provides a first search result. The processor responds to a second manipulation of the first and second icons. The processor detects a second move of the second icon over the first icon, identifies the second move as a second search request, executes a second search operation in response to the second search request, and provides a second search result different from the first search result.

Search-on-the-fly also searches on key words specified by the user. Search-on-the-fly can be used to exclude certain items. Search-on-the-fly incorporates other advanced features such as saving results by attaching a cookie to a user's computer, and associating icons with the results.

Search-on-the-fly may be used with both internal and external databases. For example, Search-on-the-fly may be used with a company internal database and one or more databases accessible through the Internet.

Search-on-the-fly is user-friendly. With one interface, many different types of databases or database schemas may be searched or sorted.

Finally, the search-on-the-fly technique, and other techniques discussed above may be used in conjunction with a method of doing business, particularly a business method that uses the Internet as a communications backbone.

DESCRIPTION OF THE DRAWINGS

The detailed description will refer to the following figures, in which like numerals refer to like objects, and in which:

Figure 30:
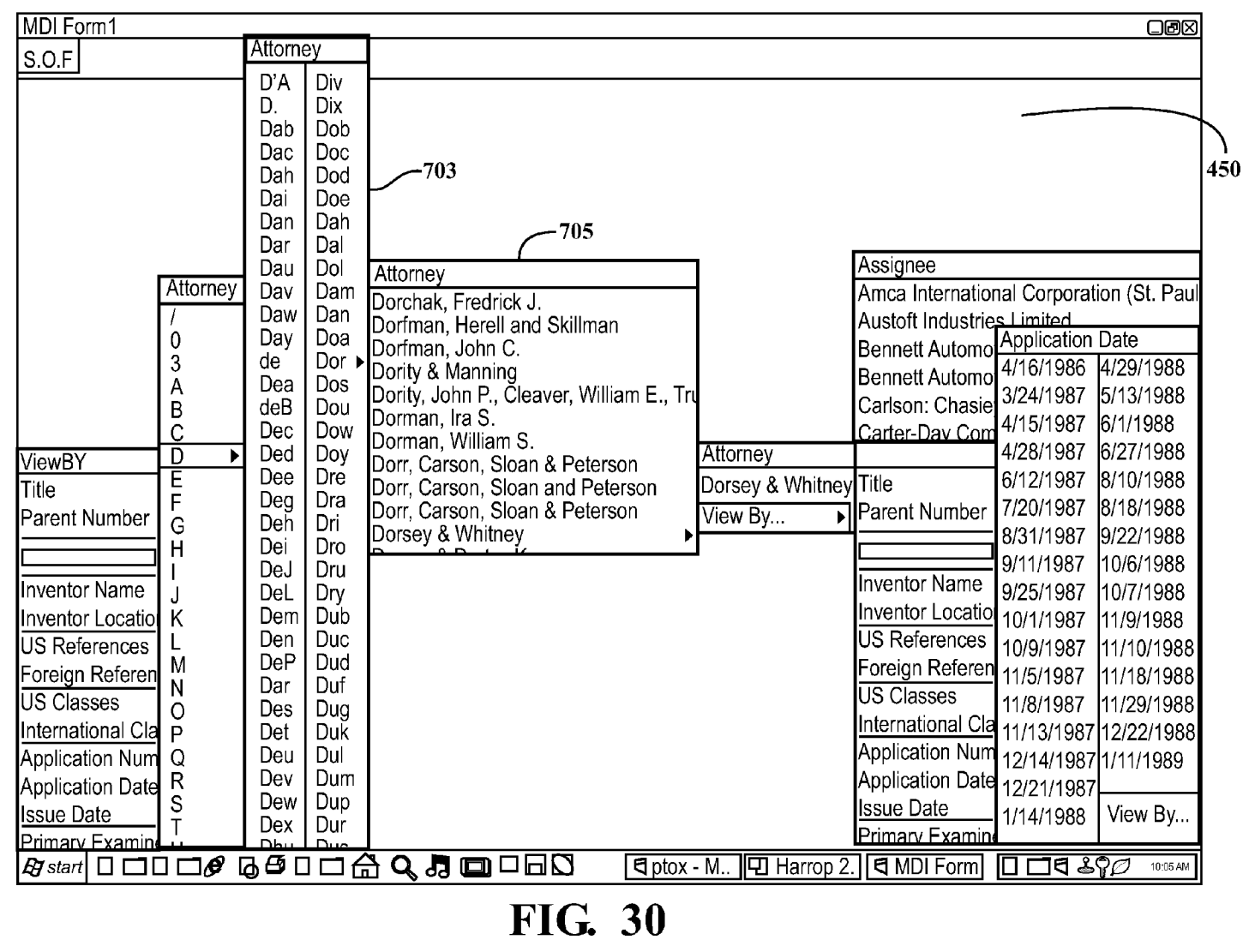

FIGS. 27-31 illustrate additional features of search-on-the-fly searching.

DETAILED DESCRIPTION

Figure 1:
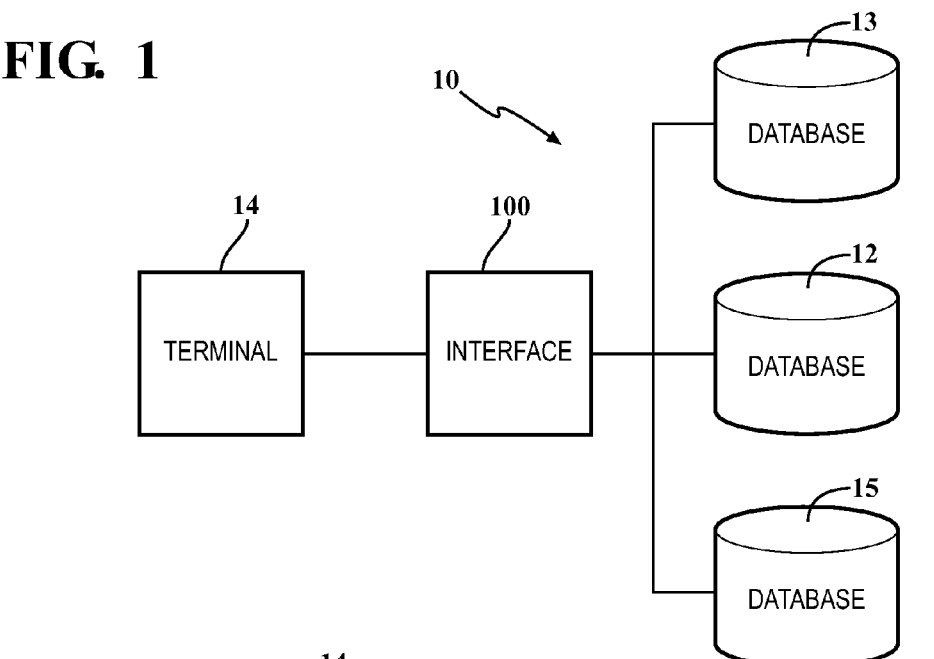
FIG. 1 is a block diagram of a system that uses a search-on-the-fly/sort-on-the-fly process.

Ordinary search engines place constraints on any search. In particular, a partial ordering of available search criteria limits application of the search engine only to certain search sequences. The user is given a choice of search sequences, and the order in which individual search steps in the search sequence become available limits the direction of the search. A user who desires to take a vacation cruise may use an Internet search engine to find a desired vacation package. The search begins with presentation of a list of general categories, and the user clicks on "travel," which produces a list of subcategories. The user then clicks on "cruises" from the resulting list of subcategories, and so on in a cumulative narrowing of possibilities until the user finds the desired destination, date, cruise line, and price. The order in which choices become available amounts to a predefined "search tree," and the unspoken assumption of the search engine designer is that the needs and thought processes of any user will naturally conform to this predefined search tree.

To an extent, predefined constraints are helpful in that predefined constraints allow a search engine to logically and impersonally order the user's thoughts in such a way that if the user has a clear idea of what object the user wants, and if the object is there to be found, then the user is assured of finding the object. Indeed, the user may want to know that choosing any available category in a search sequence will produce an exhaustive and disjunctive list of subcategories from which another choice can be made. Unfortunately, an unnecessarily high cost is too often paid for this knowledge: The user is unnecessarily locked into a limited set of choice sequences, and without sufficient prior knowledge of the object being sought, this limitation can become a hindrance. Specifically, where prescribed search constraints are incompatible with the associative relationships in the user's mind, a conflict can arise between the thought processes of the user and the function of the search engine.

At one time, such conflicts were written off to the unavoidable differences between computers and the human mind. However, some "differences" are neither unavoidable nor problematic. In the case of search engine design, the solution is elegant: upon selecting a category or entering a keyword, the user can be given not only a list of subcategories, but the option to apply previously available categories as well. In slightly more technical terms, the open topology of the search tree can be arbitrarily closed by permitting search sequences to loop and converge. Previous lists can be accessed and used as points of divergence from which new sub-sequences branch off, and the attributes corresponding to distinct sub-sequences can later be merged.

Sort-on-the-fly/search-on-the-fly data analysis, sorting access and retrieval methods and apparatus (hereafter, search-on-the-fly search engine) provide an intuitive means for analyzing various types of databases, allowing a user to obtain information about and/or access data in the database without having to know anything about the database structure. A user selects a desired term, and a database manager reviews the database for all instances of the desired term, even if a specific file or table does not contain the instance. For example, if a user wants to analyze the database using the name of a specific individual as a database entry point, the database manager will search the database or index using the desired name, and will organize the results so that all entries associated with that name are displayed. The database need not have a specific file (in a flat database) or a table (in a relational database) of names. The user may perform further on-the-fly searches to narrow the search results, or for other reasons. The search engine then conducts a further search using these criteria and produces a second search result. Further narrowing or broadening of the search are permitted, with the search engine returning results based on any new criteria.

This on-the-fly method or process can be used to simply analyze data or gather information about data stored in a database. The actual data itself does not need to be fetched, displayed, printed or even sorted. The user may simply wish to use this tool to "clean-up" data or understand how data could be sorted or for other reasons.

FIG. 1 is a block diagram of a system 10 that uses search-on-the-fly. In FIG. 1, a database 12 is accessed using a hardware/software interface device 100 to provide data to a user terminal 14. Additional databases 13 and 15 may also be accessed by the terminal 14 using the device 100. The databases 12, 13 and 15 may use different schemas, or may use a same schema. As will be described later, the device 100 may include the search-on-the-fly search apparatus. In an alternative embodiment, the search-on-the-fly search engine may be co-located with the terminal 14. In yet another embodiment, the search-on-the-fly search engine may be incorporated into the structure of one or more of the databases 12, 13 and 15. The device 100 may interface with any one or more of the databases 12, 13 and 15 using a network connection such as through the Internet, for example. Other communications mediums may also be used between the terminal 14, the device 100 and any one or more of the databases 12, 13 and 15. These mediums may include the public switched telephone network (PSTN), cable television delivery networks, Integrated Services Digital Networks (ISDN), digital subscriber lines (DSL), wireless means, including microwave and radio communications networks, satellite distribution networks, and any other medium capable of carrying digital data.

Figure 2:
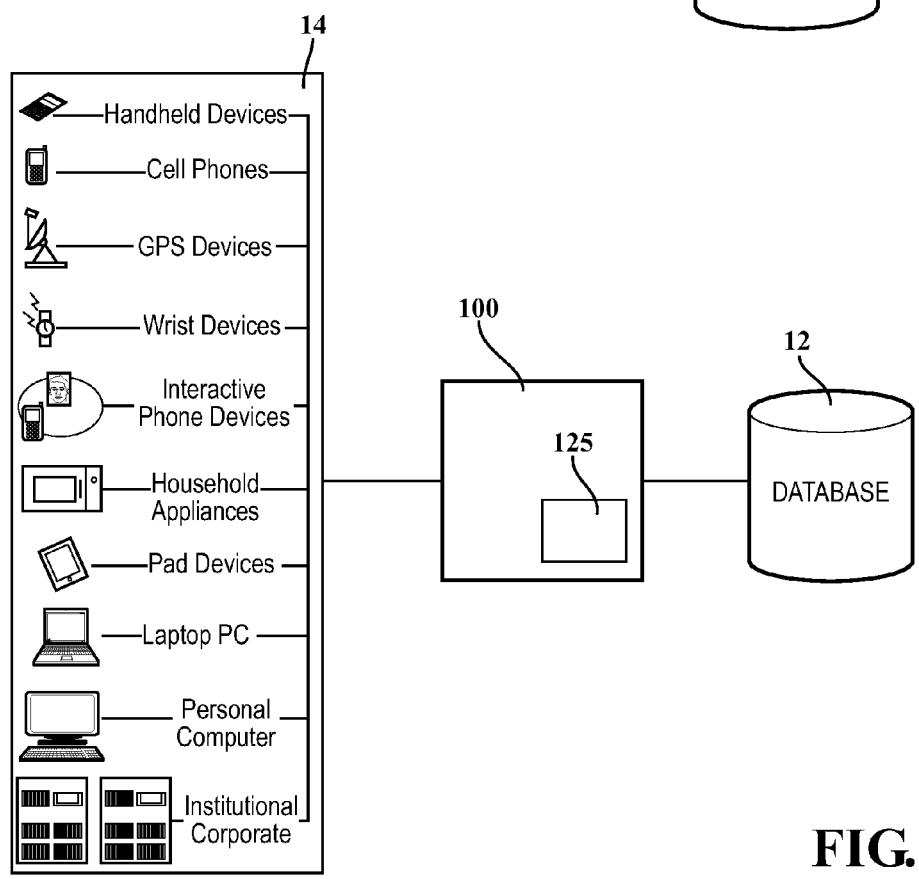
FIG. 2 is another overall block diagram of the system of FIG. 1.

The system shown in FIG. 1 is but one of many possible variations. The search-on-the-fly search engine could also be incorporated within a single computer, such as a personal computer, a computer network with a host server and one or more user stations, an intranet, and an Internet-based system, as shown in FIG. 2. Referring again to FIG. 2, the terminal 14 may be any device capable of displaying digital data including handheld devices, cellular phones, geosynchronous positioning satellite (GPS) devices, wrist-worn devices, interactive phone devices, household appliances, televisions, television set top boxes, handheld computers, and other computers.

Figure 3:
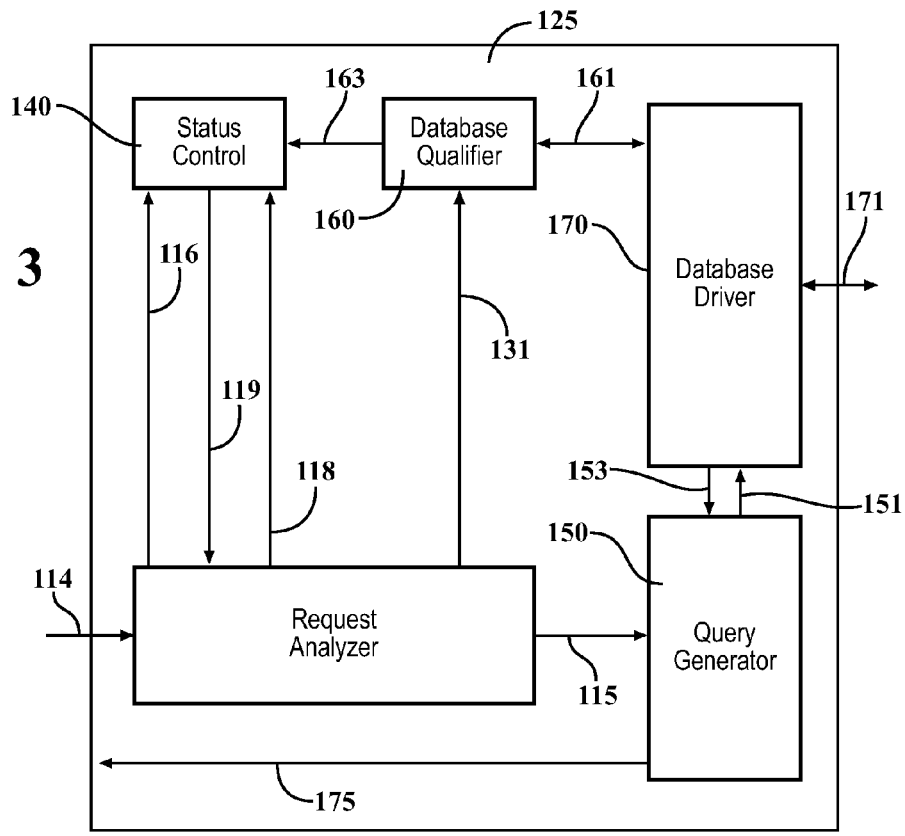
FIG. 3 is a detailed block diagram of the search engine used with the system of FIG. 2.

FIG. 3 is a detailed block diagram of an exemplary search-on-the-fly search engine 125. The search engine 125 includes a request analyzer 130 that receives search requests 114 from the terminal 14 (not shown in FIG. 3) and sends out updated requests 115 to a query generator 150. A status control 140 receives a status update signal 116 and a request status control signal 118 and sends out a request status response 119 to the request analyzer 130. The status control 140 also keeps track of search cycles, that is, the number of search iterations performed. The query generator 150 receives the updated requests 115 from the request analyzer 130 and sends a database access signal 151 to a database driver 170. The query generator 150 receives results 153 of a search of the database 12 (not shown in FIG. 3) from the database driver 170. The query generator 150 provides a display signal 175 to the terminal 14. The database driver 170 sends a database access signal 171 to the database 12. Finally, a database qualifier 160 receives information 161 from the database driver 170 and provides a list 163 of available data fields from the database 12. As will be described later, the list of available data fields 163 may be displayed to a user at the terminal 14, and may be sorted and processed using the request analyzer 130 in conjunction with the database qualifier 160. The database qualifier 160 also receives search information and other commands 131 from the request analyzer 130.

The search engine 125 may identify a database schema by simply using a trial and error process. Alternatively, the search engine 125 may use other techniques know in the art.

Such techniques are described, for example, in U.S. Pat. No. 5,522,066, "Interface for Accessing Multiple Records Stored in Different File System Formats," and U.S. Pat. No. 5,974,407, "Method and Apparatus for Implementing a Hierarchical Database Management System (HDBMS) Using a Relational Database Management System (RDBMS) and the Implementing Apparatus," the disclosures of which is hereby incorporated by reference.

The search engine 125 provides search-on-the-fly search capabilities and more conventional search capabilities. In either case, the search engine 125 may perform a preliminary database access function to determine if the user has access to the database 12. The search engine 125 also determines the database schema to decide if the schema is compatible with the user's data processing system. If the database schema is not compatible with the user's processing system, the search engine 125 may attempt to perform necessary translations so that the user at the terminal 14 may access and view data in the database 12. Alternatively, the search engine 125 may provide a prompt for the user indicating incompatibility between the terminal 14 and a selected database.

The search engine 125 may conduct a search using one or more search cycles. A search cycle includes receipt of a request 114, any necessary formatting of the request 114, and any necessary truncation steps. The search cycle ends when a result list 175 is provided to the terminal 14. The search engine 125 may retain a status of each past and current search cycle so that the user can modify the search at a later time. The user may also use this feature of retaining a status of past and current search cycles to combine results of multiple searches, using, for example, a Boolean AND function, a Boolean OR function, or other logic function. The above listed functions will be described in more detail later.

Figure 4:
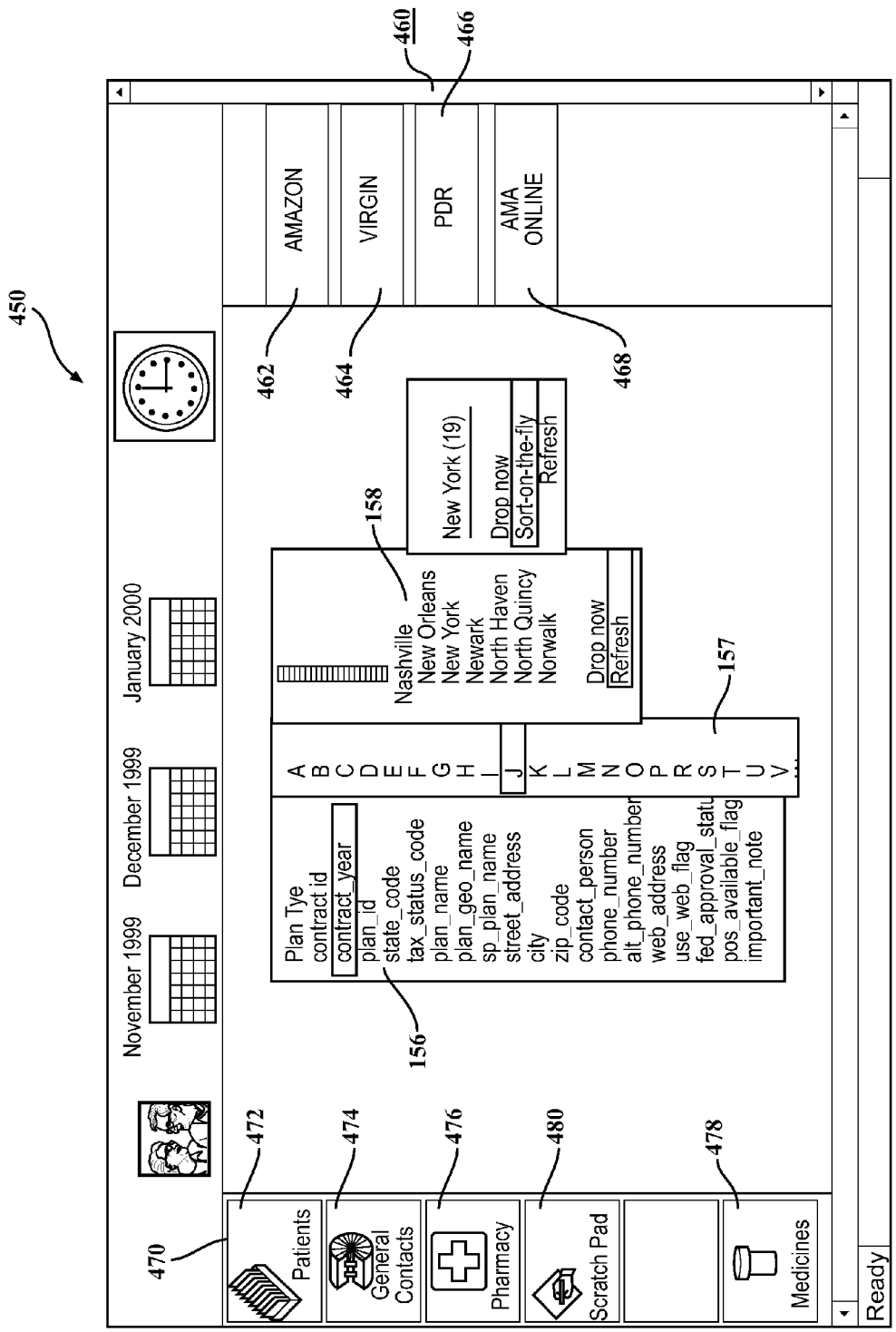
FIG. 4 is an example of a search-on-the-fly using the search engine of FIG. 3.

The search-on-the-fly function of the search engine 125 begins by determining available data fields of the database 12. The database 12 may have its data organized in one or more data fields, tables, or other structures, and each such data field may be identified by a data field descriptor. In many cases, the data field descriptor includes enough text for the user at the terminal 14 to determine the general contents of the data field. The list of data fields may then be presented at the terminal 14, for example, in a pull down list. An example of such a data field result list is shown in FIG. 4, which is from a federal database showing data related to managed health care organizations. This database is available at http://tobaccopapers.org/dnld.htm. In FIG. 4, the first data field listed is "PlanType," which is shown in result list 156. Other data field descriptors show the general categories of data in the database.

Using the terminal 14, the user may select one of the data field descriptors to be searched. For example, the user could select "city." If a number of entries, or records, in the city data field is short, a further result list of complete city names may be displayed. If the entries are too numerous to be displayed within a standard screen size, for example, the search engine 125 may, in an iterative fashion, attempt to reduce, or truncate, the result list until the result list may be displayed. In the example shown in FIG. 4, entries in the city data field are so numerous (the database includes all U.S. cities that have a managed health care organization) that the search engine 125 has produced a result list 157 that shows only a first letter of the city. Based on the available database data fields, the user may then perform a further search-on-the-fly. In this case, the user may choose cities whose first initial is "N." The search engine 125 then returns a result list 158 of cities whose names start with the letter "N." Because in this instance the result list 158 is short, no further truncation is necessary to produce a manageable list.

Figure 5:
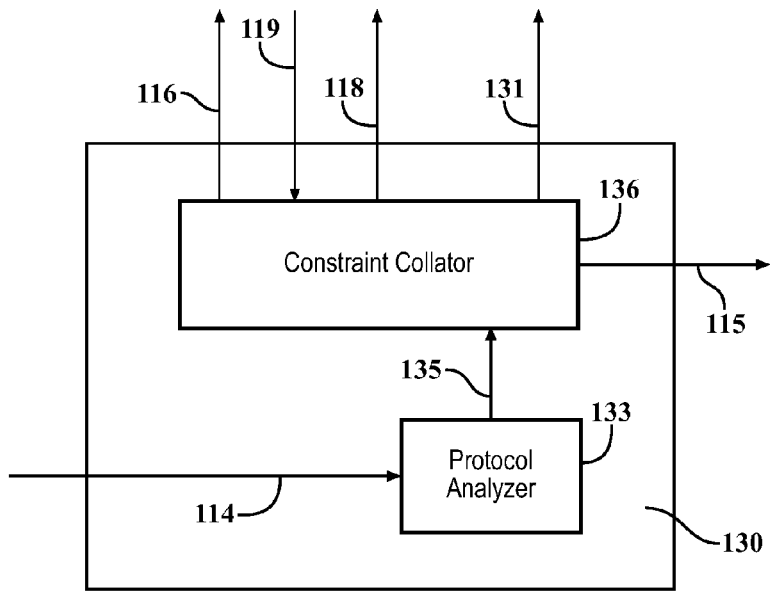
FIGS. 5-9 are detailed block diagrams of components of the search engine of FIG. 3.

FIG. 5 is a more detailed block diagram of the request analyzer 130. A protocol analyzer 133 receives the request 114 and provides an output 135 to a constraint collator 136. The protocol analyzer 133 examines the received request 114, determines a format of the request 114, and performs any necessary translations to make the request format compatible with the database to be accessed. If the database to be accessed by the terminal 14 is part of a same computer system as the terminal 14, then the protocol analyzer 133 may not be required to perform any translations or to reformat the request 114. If the database to be accessed is not part of the same computer system as the terminal 14, then the protocol analyzer 133 may be required to reformat the request 114. The reformatting may be needed, for example, when a request 114 is transmitted over a network, such as the Internet, to a database coupled to the network.

The constraint collator 136 provides the updated request 115 (which may be an initial request, or a subsequent request) to the query generator 150. The constraint collator 136 is responsible for interpreting the request 114. The constraint collator 136 performs this function by comparing the request 114 against information stored in the status control 140. In particular, the constraint collator 136 sends the request status control signal 118 to the status control 140 and receives the request status response 119. The constraint collator 136 then compares the request status response 119 to constraint information provided with the request 114 to determine if the constraint status should be updated (e.g., because the request 114 includes a new constraint). In an embodiment, the constraint collator 136 compares constraint information in a current request 114 to constraint information residing in the status control 140, and if the current request 114 includes a new constraint, such as a new narrowing request (for example, when the user clicks, touches or points over a field shown in a last search cycle), then the constraint collator 136 adds the updated information and sends the updated request 115 to the query generator 150. If the constraint status should be updated, the constraint collator 136 sends the status update 118 to the status control 140. If the request 114 is a refresh request, the constraint collator 136 sends a reset command 131 to the database qualifier 160. The updated request 115 (possibly with a new constraint) is then sent to the query analyzer 150 for further processing.

Figure 6:
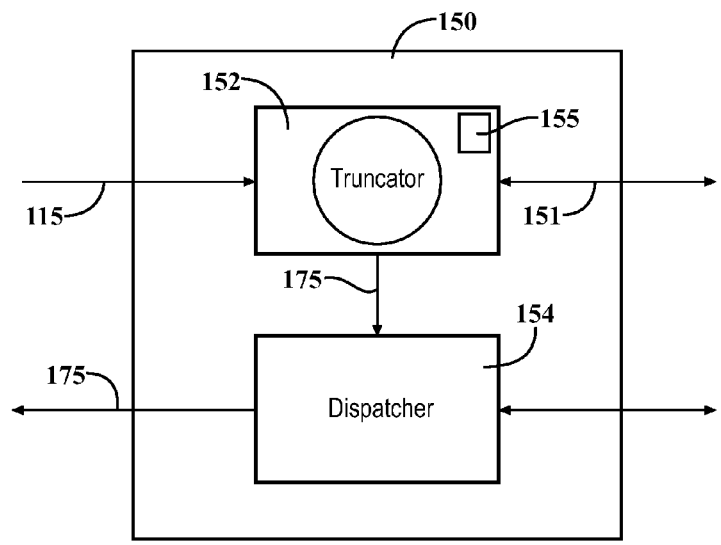

FIG. 6 is a block diagram of the query generator 150. The overall functions of the query generator 150 are to scan a database, such as the database 12, using the database driver 170, and to collect search results based on constraints supplied by the request analyzer 130. The query generator 150 then returns the search results 175 to the terminal 14.

The query generator 150 includes a truncator 152 and a dispatcher 154. The truncator 152 receives the updated request 115, including a new constraint, if applicable. The truncator 152 creates new queries, based on new constraints, and applies the new requests 151 to the database 12 using the database driver 170. Many different methods of truncating for display or viewing may be used by truncator 152. The truncator 152 may include a variable limit 155 that is set, for example, according to a capacity of the terminal 14 to display the search results 175. If data retrieved from the database 12 exceed the limit value, the truncator 152 adjusts a size (e.g., a number of entries or records) of the data until a displayable result list is achieved. One method of adjusting the size is by cycling (looping). Other methods may also be used to adjust the size of the result list. For example, the terminal 14 may be limited to displaying 20 lines of data (entries, records) from the database 12. The truncator 152 will cycle until the displayed result list is at most 20 lines. In an embodiment, the truncation process used by the truncator 152 assumes that if the user requests all values in a particular data field from the database 12, and there are no other constraints provided with the request 114, and if the size of the resulting result list is larger than some numeric parameter related to a display size of the terminal 14, then the constraints may be modified by the truncator 152 so that the result list can accommodated (e.g., displayed on one page) by the terminal 14. For example, instead of a full name of a city, some part of the name—the first n letters—is checked against the database 12 again, and n is reduced until the result list is small enough for the capacity of the terminal 14. If the maximum number of displayable results is three (3), and the database 12 contains the names of six cities "Armandia, Armonk, New Orleans, New York, Riverhead, Riverdale," then the first attempt to "resolve" the result list will stop after a result list display is created with the full name of the cities: Armandia, Armonk, New Orleans . . . (the limit was reached) Try again with 7 characters: Armandia, Armonk, New Orl, New Yor, (limit reached again) Again with 5 characters: Armandia, Armonk, New O, New Y, (limit reached again) Again with 3 characters: Arm ( . . . ), New ( . . . ), Riv ( . . . ). These results may now be displayed on the terminal 14. The display of Arm, New, Riv can then be used to conduct a further search-on-the-fly. For example, a user could then select Riv for a further search-on-the-fly. The result list returned would then list two cities, namely Riverhead and Riverdale. In another embodiment, a fixed format is imposed such that all queries generated against a database will have preset limits corresponding to the capacity of the terminal 14.

In yet another embodiment, the truncator 152 may adjust the field size by division or other means. For example, if the display limit has been reached, the truncator 125 may reduce the field size, X by a specified amount. In an embodiment, X may be divided by two. Alternatively, X may be multiplied by a number less than 1, such as ¾, for example. Adjusting the field size allows the search engine 125 to perform more focused searches and provides more accurate search results.

In another embodiment, the truncator first attempts to display information without truncation. If that is not appropriate, the truncator may attempt truncation by beginning with one character (26 letters and perhaps 10 digits) and incrementing to two characters and then three, four, until a failure to display is reached.

In still another embodiment, the user may select a limit that will cause the truncator 152 to adjust the field size. For example, the user could specify that a maximum of ten entries should be displayed.

For certain data fields, a terminal of a hand-held device, may have a very limited display capacity. For example, a personal data assistant (POA—see FIG. 52) or a cellular phone (see FIG. 50) may be used to search a database, with the results displayed on a small screen. Alternatively a user may specify a limit on the number of entries for display. In the illustrated cases, the search engine 125 may return a result list 175 of the request 114 on multiple display pages, and the user may toggle between these multiple display pages. As an example, if the terminal 14 is limited to displaying a maximum of ten entries, and if the request 114 results in a return of a data field comprising the 400 largest cities in the United States, the truncator 152 will produce a list of 23 entries comprising 23 alphabetical characters (no cities that begin with Q, Y or Z—see FIG. 4). The search engine 125 may then display the results on three pages. Alternatively, the truncator 152 could produce a list of letter groups into which the cities would fall, such as A-D, E-G, H-M, N-R, and R-X, for example. In another alternative, the search engine 125 may send a notice to the terminal that the request 114 cannot be accommodated on the terminal 14 and may prompt the user to add an additional constraint to the request 114, so that a search result may be displayed at the terminal 14.

Figure 14:
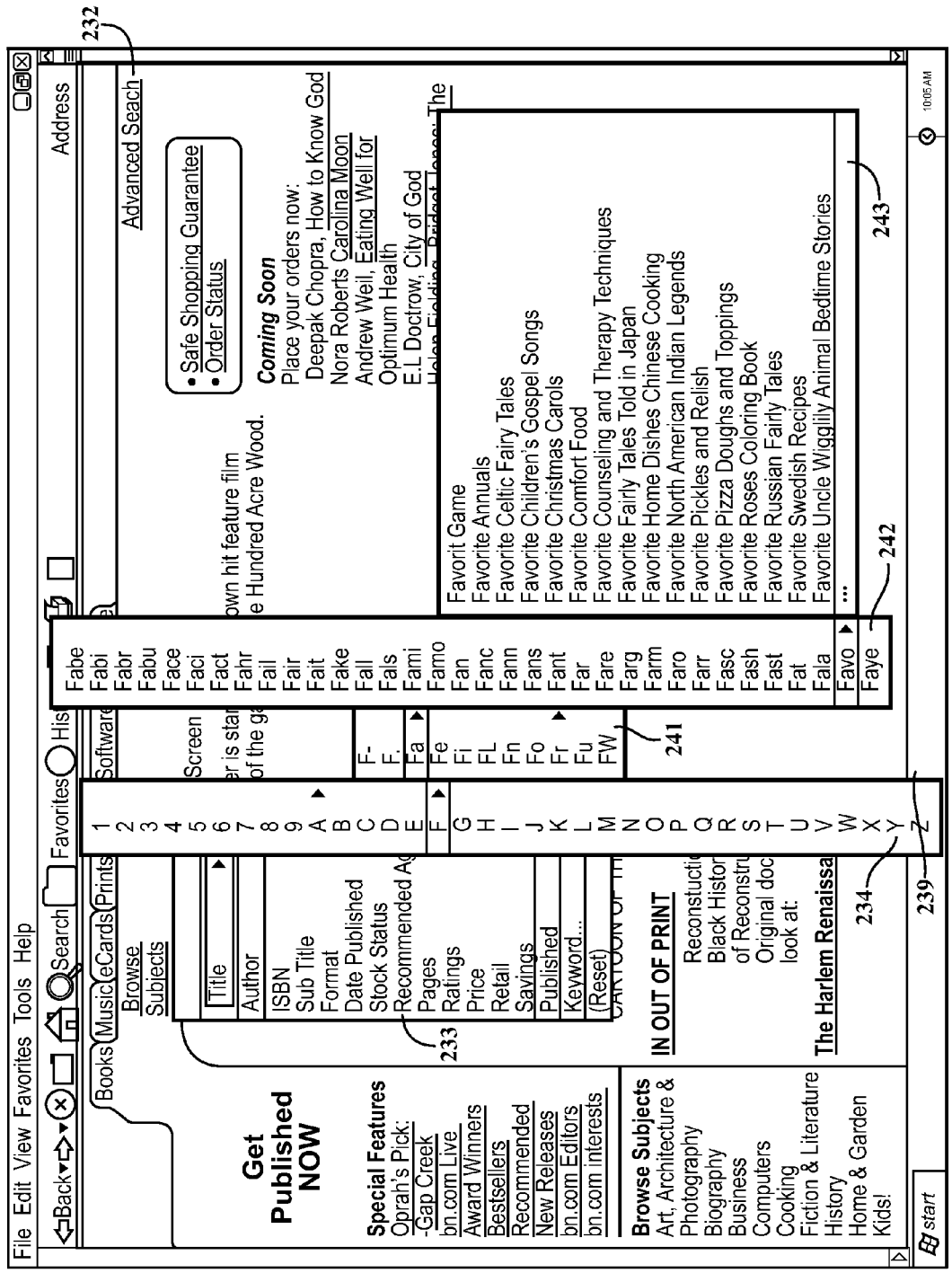

Adjusting the data field size also provides more convenient search results for the user. For example, if a user were to access an Internet-based database for books for sale, and were to request a list of all book titles beginning with the letter "F," a common search engine might return several hundred titles or more, displaying perhaps twenty titles (entries) at a time. The user would then have to look through each of many pages to find a desired title. This process could be very time-consuming and expensive. Furthermore, if the search results were too large, the common search engine might return a notice saying the results were too large for display and might prompt the user to select an alternative search request. However, performing the same search using the search engine 125 allows the truncator 152 to reduce the size of the information displayed to a manageable level. In this example, if the request 114 includes the constraint "F," the truncator 152 will loop through the data in a data field that includes book titles starting with the letter "F" until a list is available that can fit within the display limits of the terminal 14, or that fits within a limit set by the user, for example. The first list returned to the terminal 14 as a result of this request 114 may be a two letter combination with "F" as the first letter and a second letter of a book title as the second letter. For example, the first list may include the entries "Fa," "Fe," "Fi," "Fo," and "Fu," all of which represent titles of books. The user could then select one of the entries "Fa," "Fe," "Fi," "Fo," and "Fu" to perform a further search, continuing the process until one or more desired titles are displayed. An example of a similar truncation result is shown in FIG. 14.

When a parameter related to the search results is adequately truncated, the parameter is directed to the dispatcher 154, which retrieves the data from database 12 using the database driver 170. The dispatcher 154 then directs the final, truncated search results 175 back to the terminal 14 as a response to the request 114.

Figure 7:
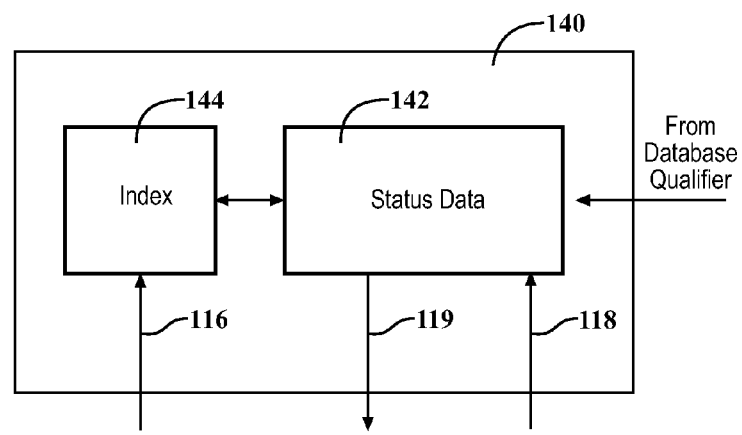

FIG. 7 is a block diagram showing the status control 140, which is responsible for monitoring the status of a current search. Due to the nature of the search engine 125, the user can choose any combination of constraints, fields or keywords, including those from past and current search cycles. The status control 140 may keep track of all past cycles of the search, as well as all information necessary to return to any of those past search cycles. The status control 140 includes a status data module 142, and an index module 144. The status data module 142 contains data related to each such search cycle, including the constraint(s) entered during the search cycle, any truncation steps taken, and the results of such truncation, for example. The index module 144 provides access to these data. When the request 114 is being analyzed by the request analyzer 130, the constraint collator 136 sends a request status query 116 to the index module 144. The status data module 142 contains information related to all past and current search cycles, which are referenced by the index module 144, and delivers a status response 119 for the most recent search cycle to the constraint collator 136. When a new constraint is sent to the query generator 150, the status data module 142 is updated 118 by the constraint collator 136. Specific structures of the request 114, the request status query 116, the status response 119 and the request status control 118 will be provided later.

The status data module 142 may be reset by the database qualifier 160 with all available fields when a refresh function is used. In an embodiment, the refresh function may be used to clear all past search cycles and the current search cycle from the status control 140. In such an event, the search results, such as the search results shown in FIG. 4, will no longer be displayed at the terminal 14, and data related to the past and the current search cycles may not be used for future search cycles. In effect, the refresh function may cause the entire search to be discarded. The refresh function may be activated when a user selects a refresh button (see FIG. 4) on a displayed result list, or on another portion of a GUI. Alternatively, the refresh function may discard selected search cycles. In this alternative embodiment, the user may, for example, move a cursor to a desired result list from a past search cycle and activate a refresh, reset, back, or drop button. All data associated with search cycles subsequent to the selected search cycle, including all displayed result lists may then be discarded.

Figure 8:
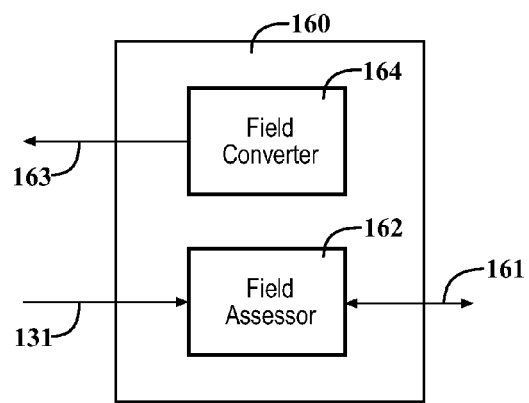

FIG. 8 is a block diagram showing the database qualifier 160. The database qualifier 160 provides data field information at the start of a search or when the search engine 125 is refreshed. A field assessor 162 access the database 12 using the database driver 170, and identifies and accesses discrete data fields and other information in the database 12. A field converter 164 structures the data field information into a usable (searchable/sortable) structure and sends 163 the formatted data field information to the status control 140. Techniques for identifying and accessing the data fields, and for formatting the data field information are well known in the art. Such techniques are described, for example, in U.S. Pat. No. 5,222,066, Interface for Accessing Multiple Records Stored in Different File System Formats, the disclosure of which is hereby incorporated by reference.

Figure 9:
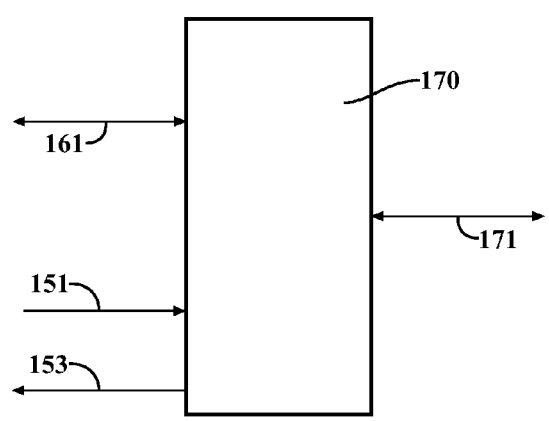

FIG. 9 is a block diagram of the database driver 170. The database driver 170 is the universal interface with the database 12, which can be a local or a remote database.

Figure 10:
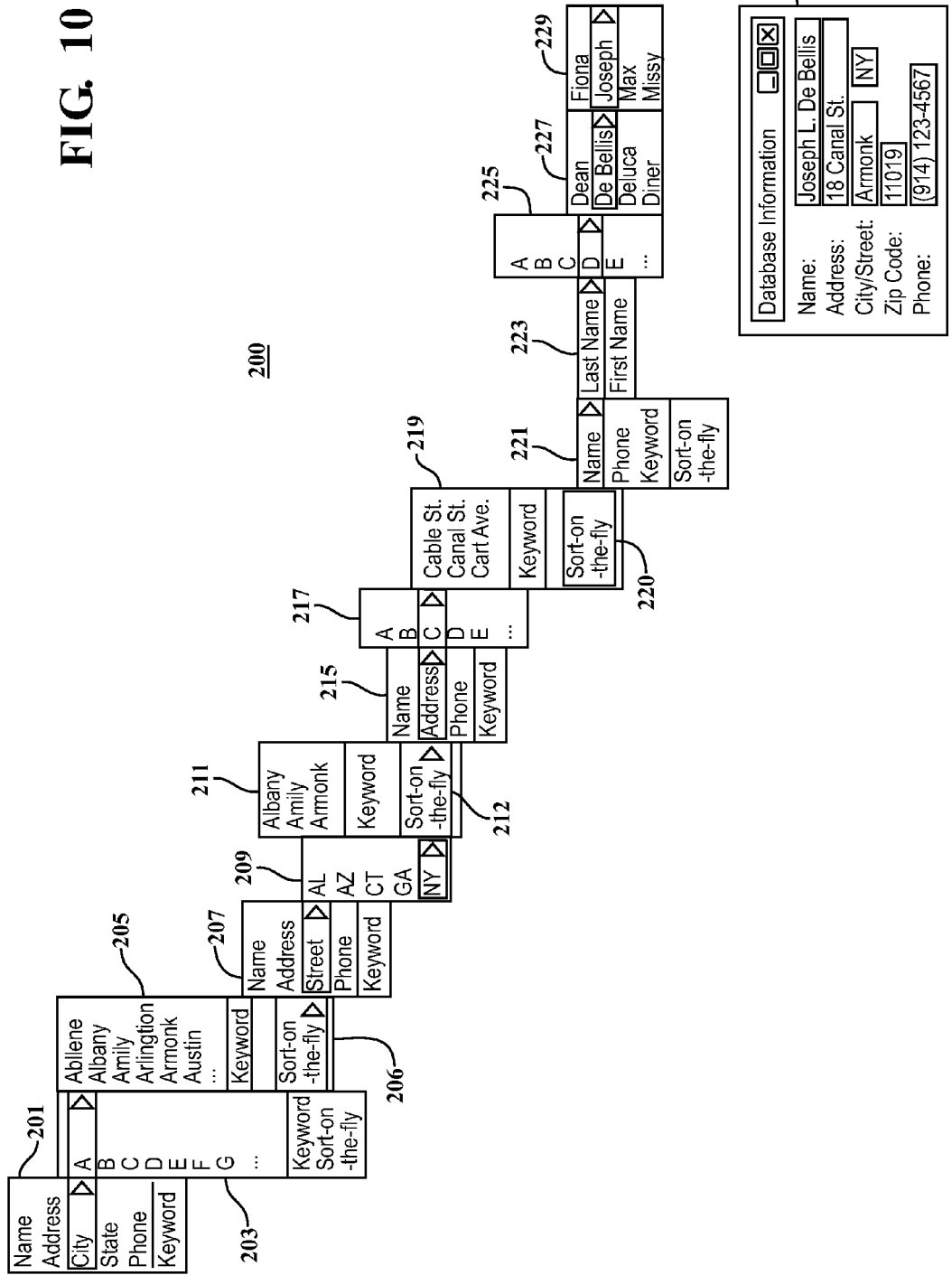
FIG. 10 is another example of a search-on-the-fly using the search engine of FIG. 3.

FIG. 10 is an example of a search-on-the-fly using the search engine 125. In FIG. 10, a database 200 includes information related to a number of individuals. The information in the database 200 may be presented at the terminal 14 using a series of screens or menus 201-230. The user first accesses the database 200 and is presented with a list 201 of the information or data fields contained in the database 200. The result list 201 is generated by the field assessor 162, and is provided for display at the terminal 14 by the query generator 150. As shown in FIG. 10, a user has selected the data field "City" for display of information. However, the number of "cities" listed in the database 200 is too large to conveniently display at one time (i.e., on one page) at the terminal 14. Accordingly, the truncator 152 will loop a required number of times until an adequate display is available. In FIG. 10, the menu 203 shows the results of the truncation with only the first letter of a city name displayed.

Using the menu 203, the user has selected cities beginning with the letter "A.". The results are shown in menu 205. Now, the user elects to conduct another search-on-the-fly, by selecting the "sort-on-the-fly" option 206. The query generator 150 displays all the information fields available from the database 200, except for the information field already displayed, namely "City." The results are displayed in menu 207. The user then elects to further search on the data field "State." The query generator 150 returns the requested information as displayed in menu 209, listing five states by their common two-letter abbreviation. The user then chooses New York from the menu 209, and the query generator 150 returns a list of cities in New York, menu 211.

Next, the user elects to conduct another search-on-the-fly, option 212, and the query generator 150 returns only the remaining data fields for display in menu 215. From the menu 215, the user selects "Address" for the next data field to search, and the query generator 150 returns a menu 217 showing only first letters of the address. This signifies that the data field "Address" was too large to be easily displayed on the terminal 14. The user then elects to search on all addresses that begin with "C." The query generator 150 returns a list of addresses by displaying only street names, menu 219.

The user then elects to conduct a further search-on-the-fly, option 220, and the remaining two data fields, "Name" and "Phone" are displayed as options in menu 221. The user selects name, and the query generator returns a further breakdown of the data by last name and by first name, menu 223. This process continues, with further menus being used to select a last name and a first name from the database 200. When the final selection is made, information from the database 200 related to the individual is displayed in window 230.

In the example shown in FIG. 10, the user could have refreshed the search engine 125 at any time, and the search would have recommenced at the beginning. Alternatively, the user could, by simply selecting a prior menu, such as the menu 215, have changed the course of the search. In this alternative, if the user had gone back to the menu 215 and instead of selecting "Address" selected "Phone," then the menus 217-229 would be removed from display at the terminal 14, and the search would begin over from the point of the menu 215.

Figure 11:
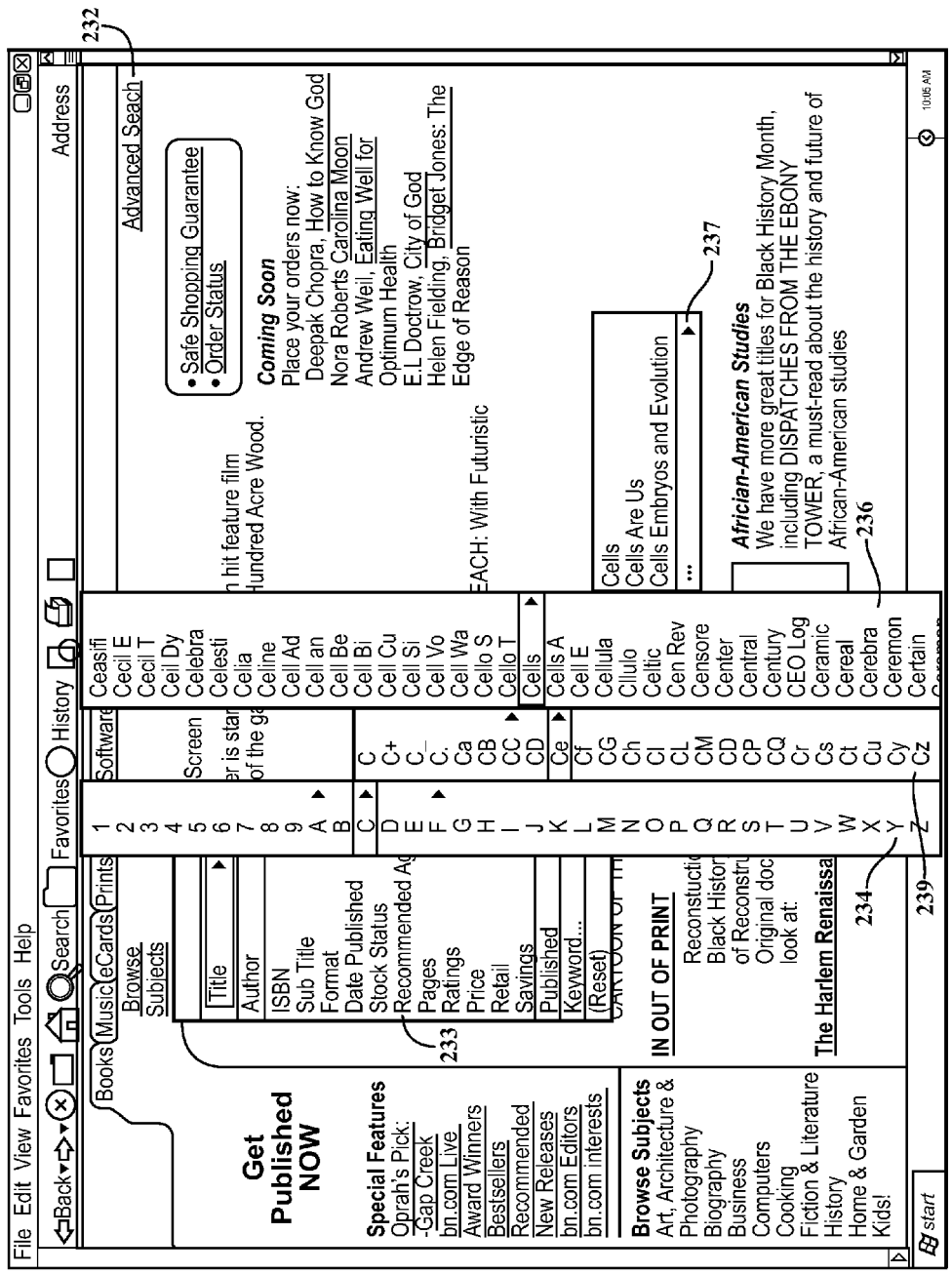
FIGS. 11-15*b* are additional examples of a search-on-the-fly using the search engine of FIG. 3.
Figure 12:
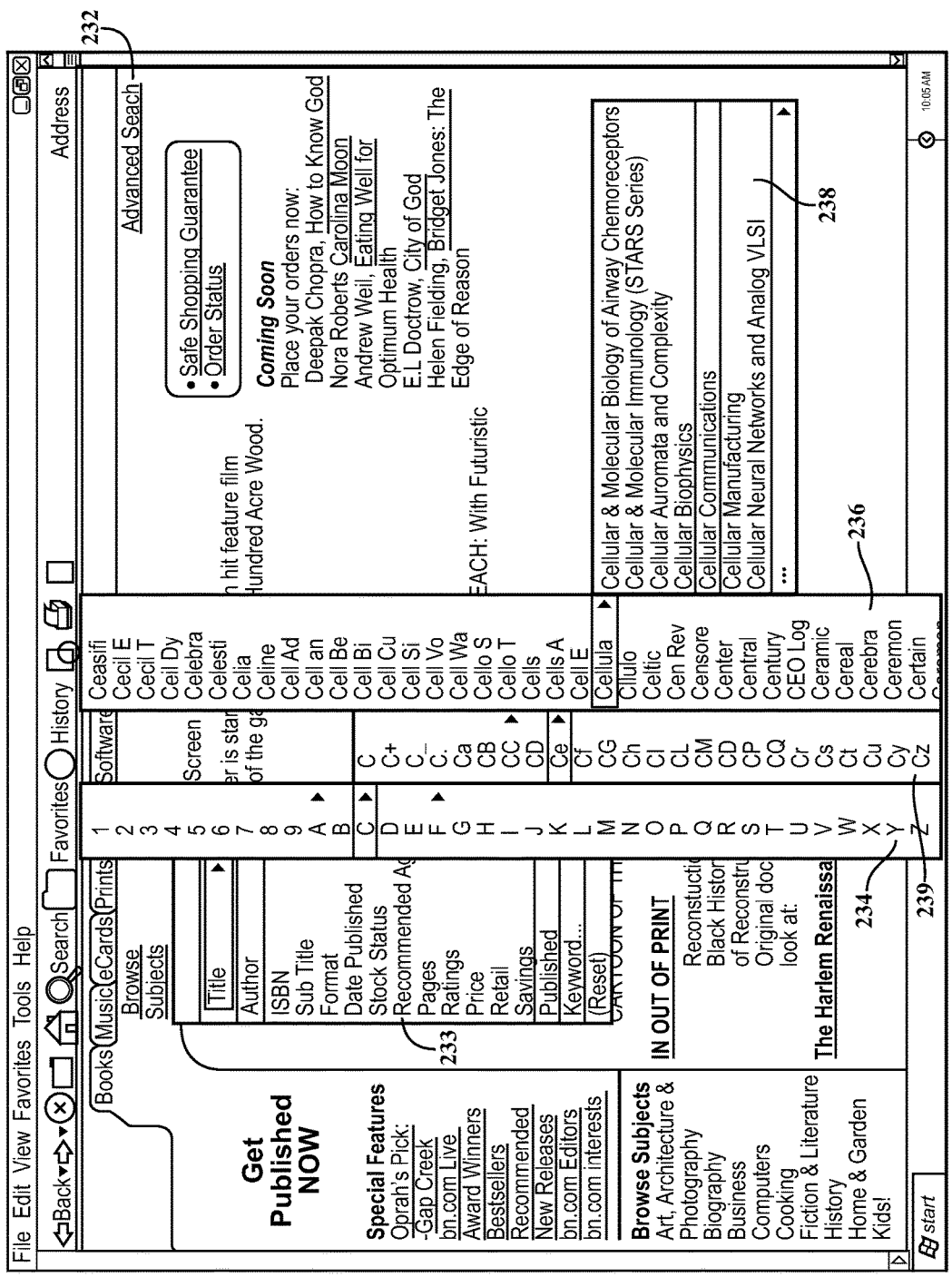
Figure 13:
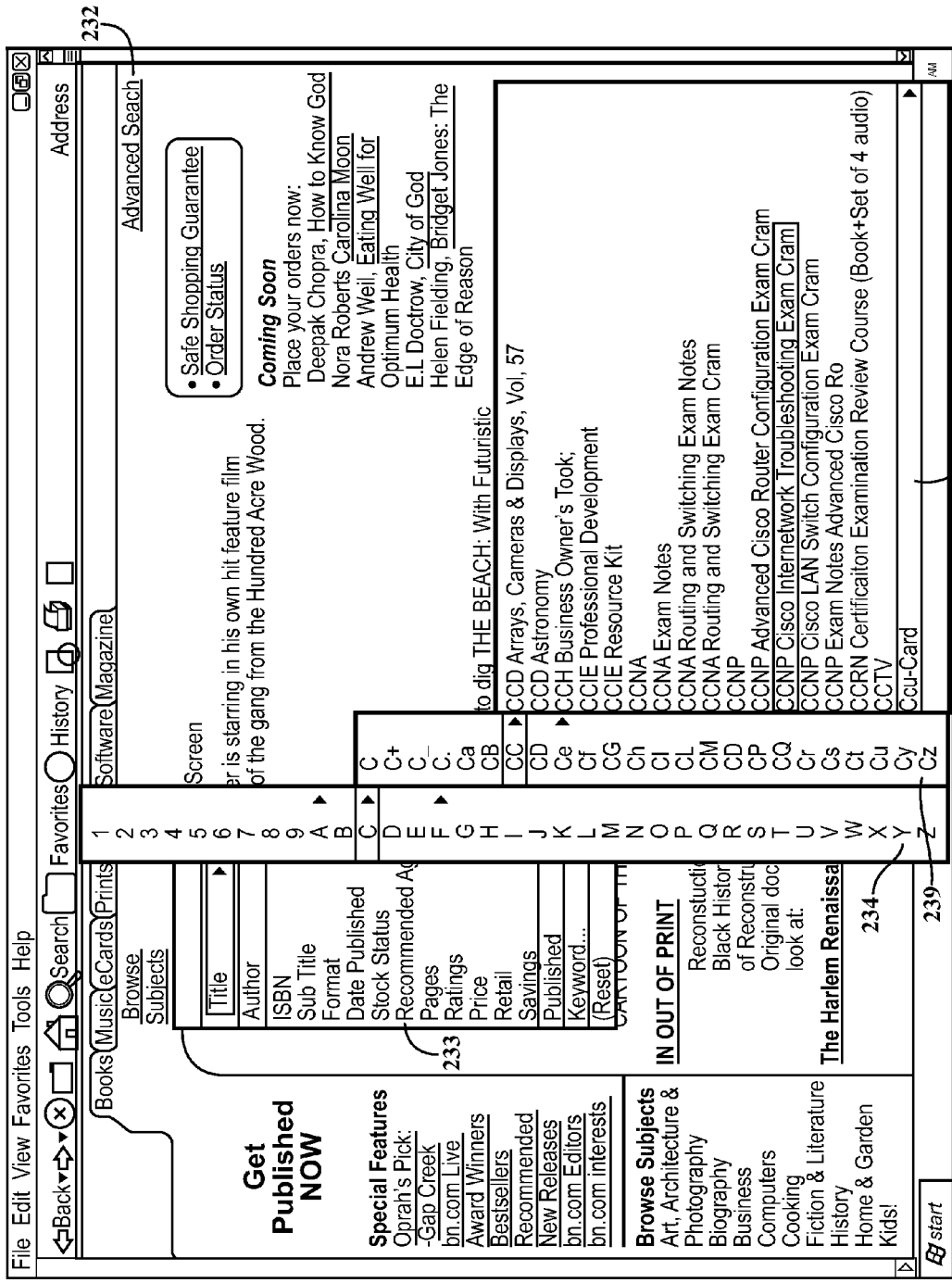

FIGS. 11-15b illustrate exemplary searches of a remote database, such as the database 13 shown in FIG. 1. The database in the illustrated example is for an Internet website 232 that sells books. The examples illustrated are based on a Barnes & Noble™ website. In FIG. 11, the user has applied the search engine 125 to the website 232 database, and the query generator 150 has returned a list 233 of data fields from which the user may select to access data from the website 232 database. The list 233, and other lists described below, may be displayed as overlays on the website 232. In the example illustrated, the user selects "Title" for the first search cycle. Because the list of titles is too large to easily display at the terminal 14, the truncator 152 loops until an alphanumeric list 234 is created. The list 234 is then returned to the terminal 14. For the next search cycle, the user selects titles that begin with the letter "C." Again, the data field contains too many entries to conveniently display at the terminal 14, and the truncator 152 loops as appropriate until list 235 is created. The process continues with subsequent lists 236 and 237 being returned to the terminal 14.

FIGS. 12-15b illustrate alternate searches that may be completed using the website 232 database.

Figure 15A:
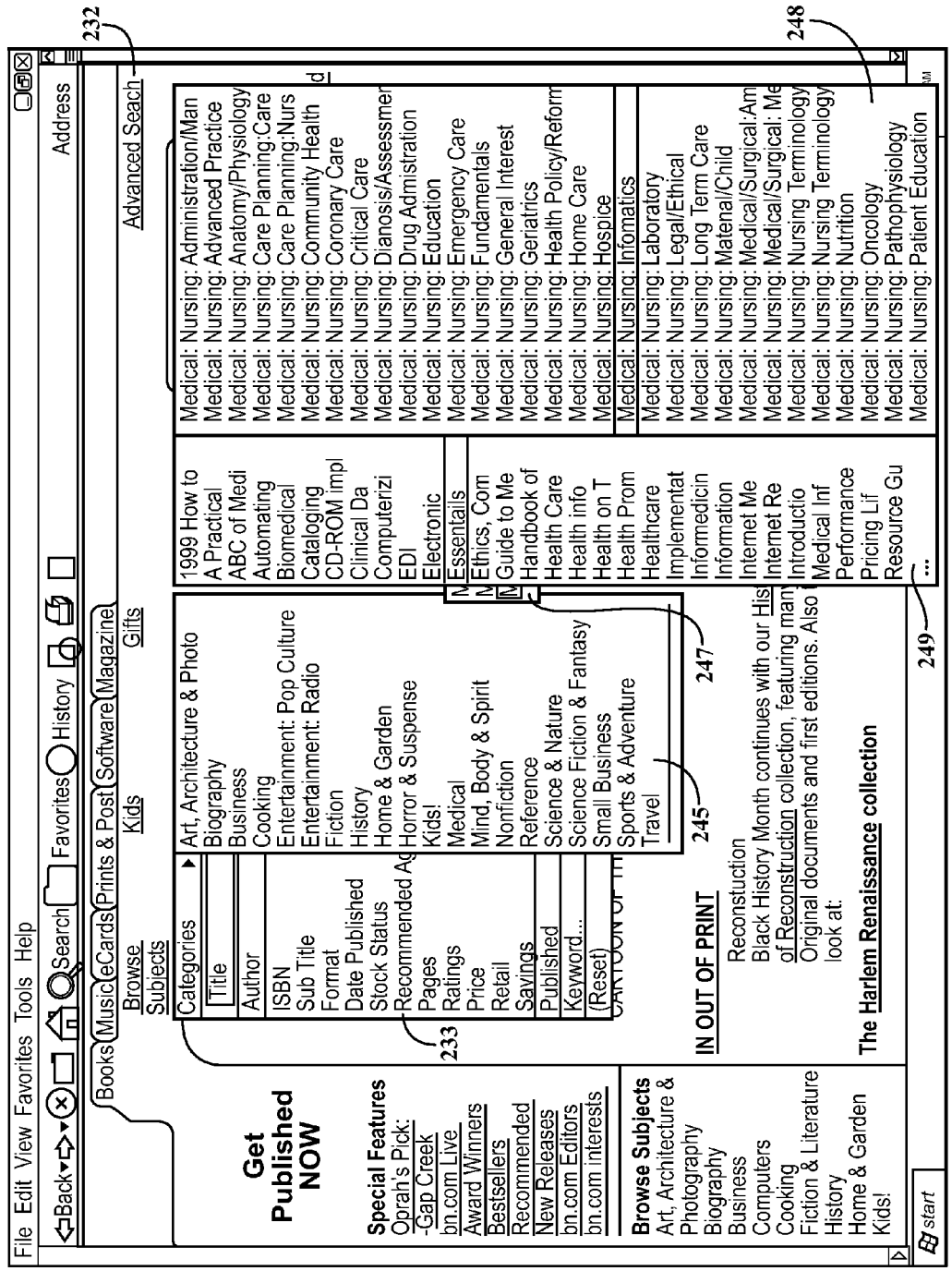
Figure 15B:
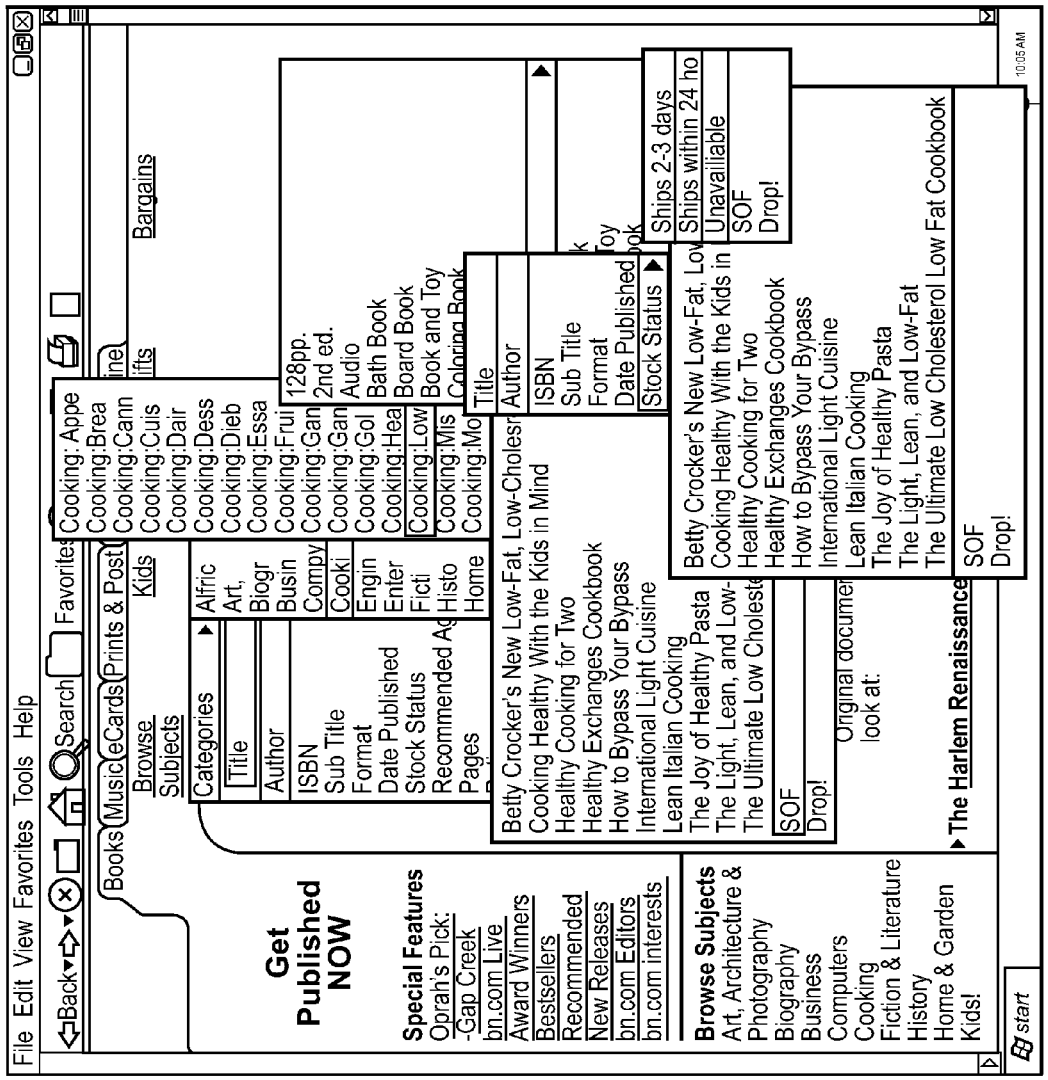

For the search results shown in FIGS. 11-15b, the status control 140 may iterate as follows:

Status Control Started . . . Key: Title1 Option: Title Level: 1 Filter: Field: Title Key: A2 Option: A Level: 2 Filter: SUBSTRING([Title],1,1)='A' Field: Title Key: AA3 Option: AA Level: 3 Filter: SUBSTRING([Title], 1,2)='AA'AND SUBSTRING([Title],1,1)='A' Field: Title Key: F4 Option: F Level: 4 Filter: SUBSTRING([Title],1, 1)='F' Field: Title Key: Fa5 Option: Fa Level: 5 Filter: SUB- STRING([Title],1,2)='Fa' AND SUBSTRING([Title],1,1)='F' Field: Title Key: Favo6 Option: Favo Level: 6 Filter: SUBSTRING([Title],1,4)='Favos' AND SUBSTRING([Title],1,2)='Fa' AND SUBSTRING([Title],1,1)='F' Field: Title Key: C7 Option: C Level: 7 Filter: SUBSTRING([Title],1,1)='C' Field: Title Key: Ce8 Option: Ce Level: 8 Filter: SUBSTRING([Title],1,2)='Ce' AND SUBSTRING([Title],1,1)='C' Field: Title Key: Cells9 Option: Cells Level: 9 Filter: SUBSTRING([Title],1,5)='Cells' AND SUBSTRING([Title],1,2)='Ce' AND SUBSTRING([Title],1,1) 'C' Field: Title Key: Cellula10 Option: Cellula Level: 10 Filter: SUBSTRING([Title],1,7)='Cellula' AND SUBSTRING([Title],1,2)='Ce' AND SUBSTRING([Title],1,1)='C' Field: Title Key: CC11 Option: CC Level: 11 Filter: SUBSTRING([Title],1,2)='CC' AND SUBSTRING([Title],1,1)='C' Field: Title Status Control Terminate FIG. 15b shows the results for a search for a low-fat cookbook using the search engine 125 as applied to a remote database. In this example, the remote database is coupled to a Barnes & Noble web page. The first query, and resulting message strings, are illustrated by the following: Query Analyzer Message Received: ACK Status Control: Refresh Dispatcher Message Sent: Categories.about.-.about.Title.about.-.about.Author.about.-about. ISBN.about.SubTitle.about.Format.about.Date Published.about.Stock Status.ab-out.Recommended Age.about.Pages.about.Ratings.about. Price.about Retail.about.Savings.abou-t.-.about.Publisher Query Analyzer Message Received: CLK#0#1#Categories Status Control received an update: Key: Categories' Option: Categories Level: 1 Filter: Field: Categories Query Generator Request is not cached, processing Generated Query: SELECT DISTINCT [Categories] FROM Books ORDER BY [Categories] Number of Matching Records: 2032 Generated Query: SELECT DISTINCT SUBSTRING([Categories],1,82) FROM Books ORDER BY SUBSTRING([Categories],1,82) Number of Matching Records: 2022 Generated Query: SELECT DISTINCT SUBSTRING([Categories],1,61) FROM Books ORDER BY SUBSTRING ([Categories],1,61) Number of Matching Records: 1995 Generated Query: SELECT DISTINCT SUBSTRING([Categories],1,45) FROM Books ORDER BY SUBSTRING ([Categories],1,45) Number of Matching Records: 1751 Generated Query: SELECT DISTINCT SUBSTRING([Categories],1,33) FROM Books ORDER BY SUBSTRING ([Categories],1,33) Number of Matching Records: 1251 Generated Query: SELECT DISTINCT SUBSTRING([Categories],1,24) FROM Books ORDER BY SUBSTRING ([Categories],1,24) Number of Matching Records: 799 Generated Query: SELECT DISTINCT SUBSTRING ([Categories],1,18) FROM Books ORDER BY SUBSTRING([Categories],1,18) Number of Matching Records: 425 Generated Query: SELECT DISTINCT SUBSTRING([Categories],1,13) FROM Books ORDER BY SUBSTRING([Categories],1,13) Number of Matching Records: 319 Generated Query: SELECT DISTINCT SUBSTRING([Categories],1,9) FROM Books ORDER BY SUBSTRING([Categories],1,9) Number of Matching Records: 147 Generated Query: SELECT DISTINCT SUBSTRING([Categories],1,8) FROM Books ORDER BY SUBSTRING([Categories],1,8) Number of Matching Records: 111 Generated Query. SELECT DISTINCT SUBSTRING([Categories],1,7) FROM Books ORDER BY SUBSTRING([Categories],1,7) Number of Matching Records: 78 Generated Query: SELECT DISTINCT SUBSTRING([Categories],1,6) FROM Books ORDER BY SUBSTRING([Categories],1,6) Number of Matching Records: 44 Generated Query: SELECT DISTINCT SUBSTRING([Categories],1,5) FROM Books ORDER BY SUBSTRING([Categories],1,5) Number of Matching Records: 26 Truncator finished, took 15 seconds to make 13 iterations Caching this request . . . Dispatcher Message Sent: Afric.about.Art, .about.Bio.about.Busin.about.Compu.about.Cooki.about.Engin.about.Enter.ab-out.Ficti.about.Histo.about.Home.about.Horro.about.Kids!.about.Law: .about.Medic.about.Mind.about.Nonfi.about.Paren.about.Poetr.about.Refer.-about.Relig.about.Scien.about.Small.about.Sportabout.Trave.about.Write.ab-out. Query Analyzer Message Received: CLKCategories In the example illustrated by FIG. 15b and the above-listed message strings, an initial request would have returned 2032 book titles for cook books. This number of entries may be too large. Accordingly, the truncator 152, through 13 iterations, reduces the entries in a result list to 26. The entries in the truncated result list can then be easily reviewed by the user, and further searches may be performed to identify a desired book. As can be seen in FIG. 15b, the user has selected "Categories" as a data field to search. As is also shown in FIG. 15b, the search engine 125 may display other information windows, such as book availability, ordering and shipping information windows. With a simple drag-and-drop cursor operation, for example, the user may then order and pay for the desired book.

Figure 16:
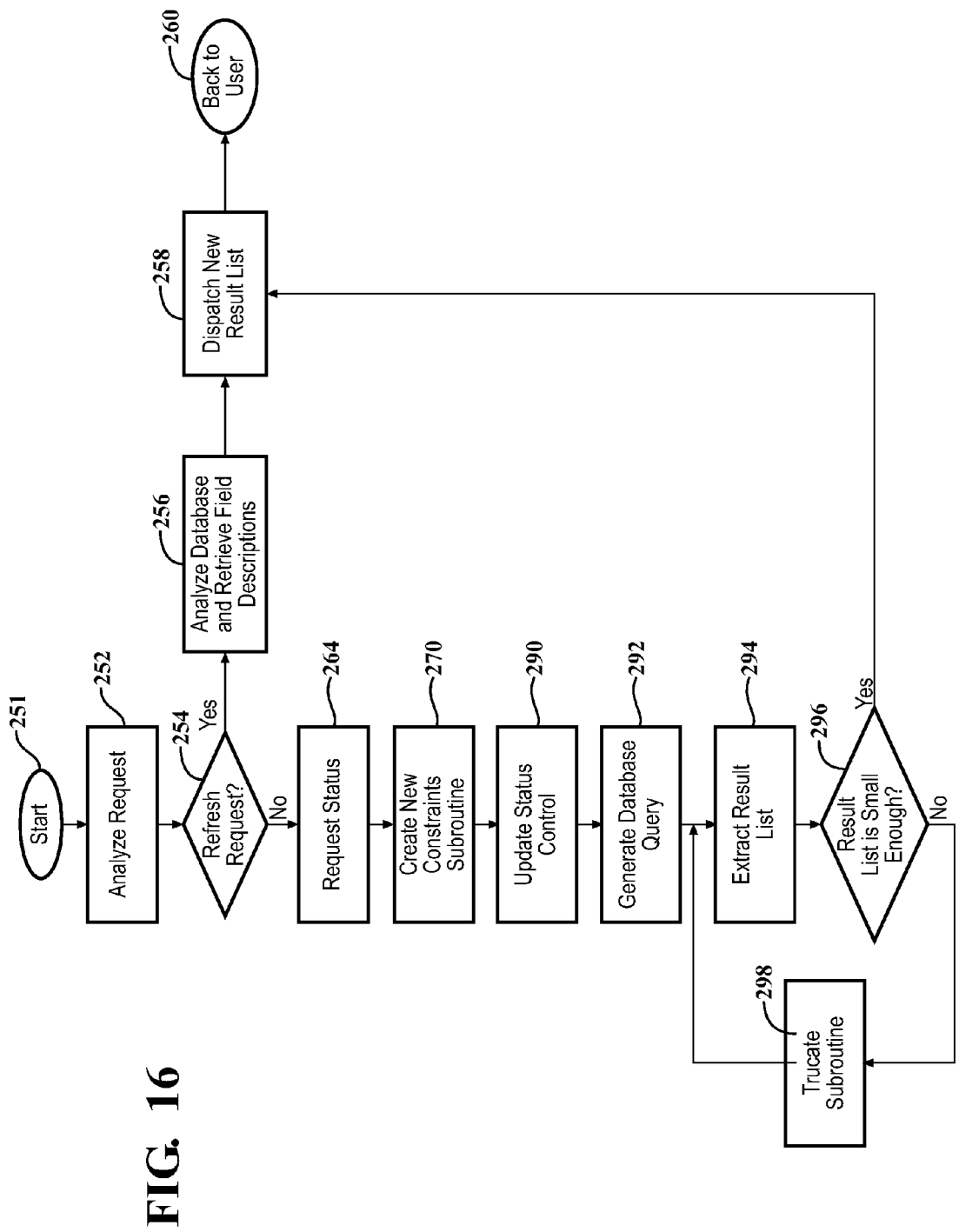
FIGS. 16-20 are flow charts illustrating operations of the search engine of FIG. 3.

FIG. 16-20 are flow charts illustrating operations of the search engine 125. FIG. 16 is a flowchart of an overall search routine 250. The process starts in block 251. The request analyzer 130 receives the request 114, block 252. The request 114 may be made using a hierarchical menu-based display or a graphical user interface, with one or more layers. Using either the menu or the GUI, the user may enter specific details by typing, selection of iconic symbols or pre-formatted text, and by using well-known data entry techniques, for example. The request 114 may also comprise a simple text or voice query. Use of voice recognition may be particularly useful in mobile environments, and to speed access to the database 12. Use of voice recognition may include simple commands, such as UP, DOWN, and SELECT, to select search terms from a pre-formatted list that is presented to the user at the terminal 14. More sophisticated use of voice recognition may include actually speaking letters or numbers, or full search terms, such as speaking a key word for a key word search, for example.

The protocol analyzer 133 provides an output 135 to the constraint collator 136, and the constraint collator 136 determines the nature of the request, block 254. If the request 114 is a refresh request (i.e., a command to initiate the refresh function), the constraint collator 136 sends a reset command 131 to the database qualifier 160. The updated request 115 (possibly with a new constraint) is then sent to the query analyzer 150 for further processing, including analyzing the database 12, retrieving field descriptors, and formatting, block 256. The result of the data field descriptor retrieval and formatting are shown as an available data fields result list, block 258, and is returned to the terminal 14, block 260.

In block 254, if the request 114 is not a refresh request, the constraint collator 136 provides the updated request 115 (which may be an initial request, or a subsequent request) to the query generator 150, block 264. The constraint collator 136 compares the request 114 against information stored in the status control 140. In particular, the constraint collator 136 sends the request status control signal 118 to the status control 140 and receives the request status response 119. The constraint collator 136 then compares the request status response 119 to constraint information provided with the request 114 to determine if the constraint status should be updated (e.g., because the request 114 includes a new constraint). If the constraint status should be updated, the constraint collator 136 calls create new constraint subroutine 270, and creates new constraints.

Figure 17:
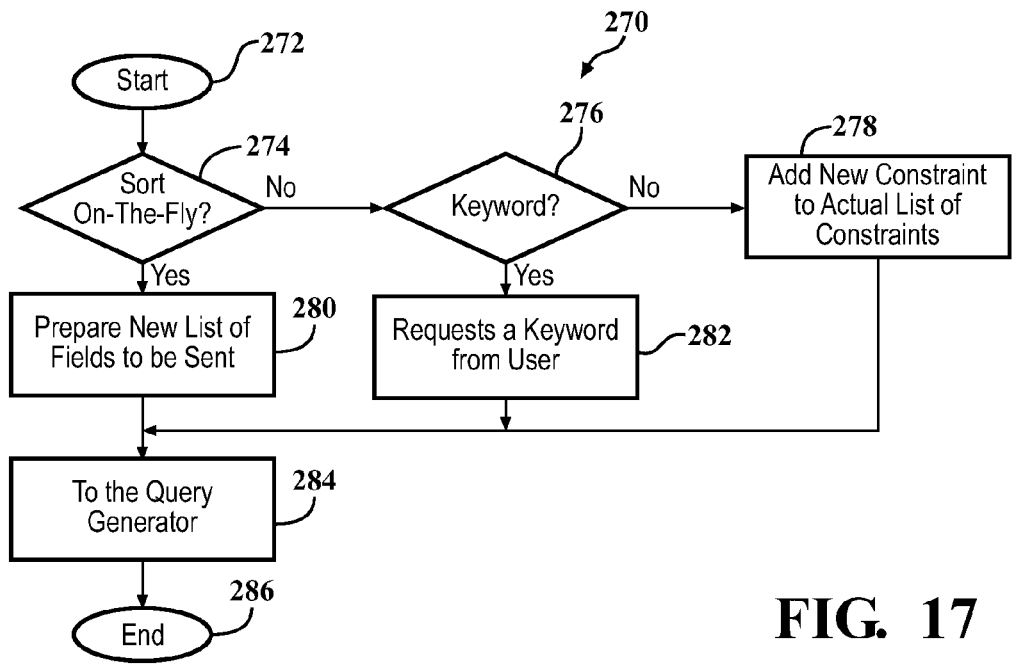

The create new constraints subroutine 270 is shown as a flowchart in FIG. 17. The subroutine starts at 272. In block 274, the constraint collator 136 determines if the request is for a sort-on-the-fly operation. If sort-on-the-fly has been selected, field assessor 162 prepares a new set of data fields, block 280. The new set of data fields are then sent to the query generator 150, block 284, and the subroutine 270 ends, block 286.

In block 274, if sort-on-the-fly was not selected, the request analyzer 130 may receive a key word constraint, block 276. The query generator 150 will then generate an input window in which the user may enter a desired key word, block 282. Alternatively, the query generator 150 may prompt the user to enter a key word using voice recognition techniques, or any other way of entering data. The process then moves to block 284. In block 276, if a key word search option was not selected, the constraint collator 136 enters the new constraint to the existing list of constraints, block 278. The process then moves to block 284.

Returning to FIG. 16, the constraint collator 136 next updates the status control 140, block 290. In block 292, using the updated constraints, the query generator 150 generates a next query of the database 12, block 292. The database driver 170 then extracts the result list from the database 12, according to the latest query, block 294. In block 296, the truncator 152 determines if the result list may be displayed at the terminal 14. If the result list cannot be displayed, the process moves to block 298, and a truncation routine is executed. The process then returns to block 294. If the result list in block 296 is small enough, the result list is provided by the dispatcher 154 to the terminal 14, block 258.

As noted above, the request analyzer 130 determines the nature of the request, including any special commands. A special command may include a command to conduct a search-on-the-fly. Alternatively, the search engine 125 may adopt a search-on-the-fly mechanism as a default value. The search engine 125 also may incorporate other special search commands, such as a Boolean search, for example.

Figure 18:
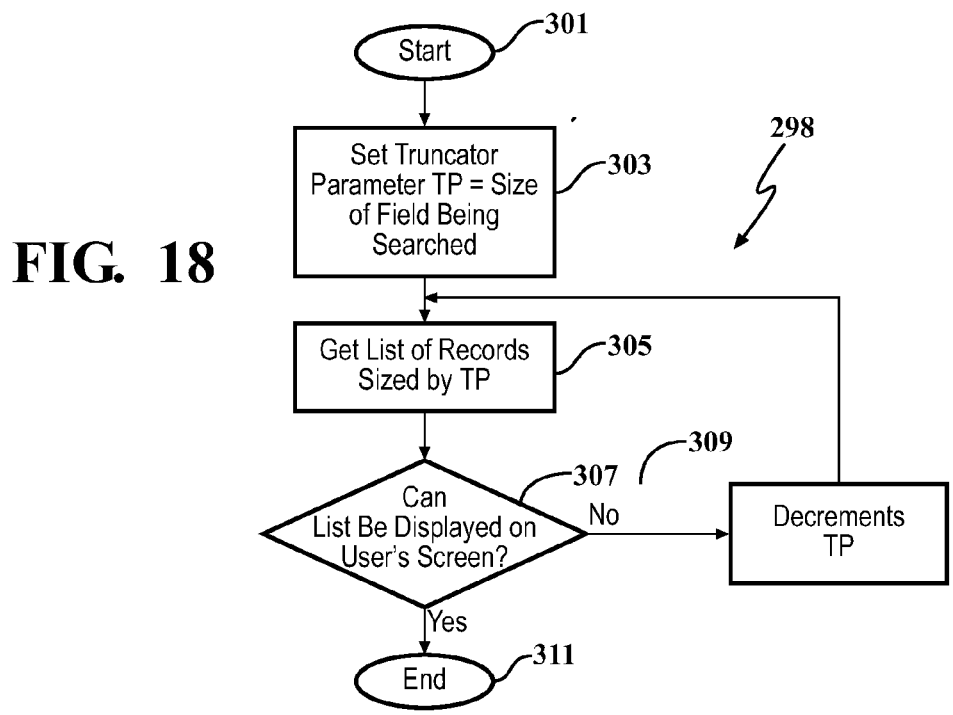
Figure 19:
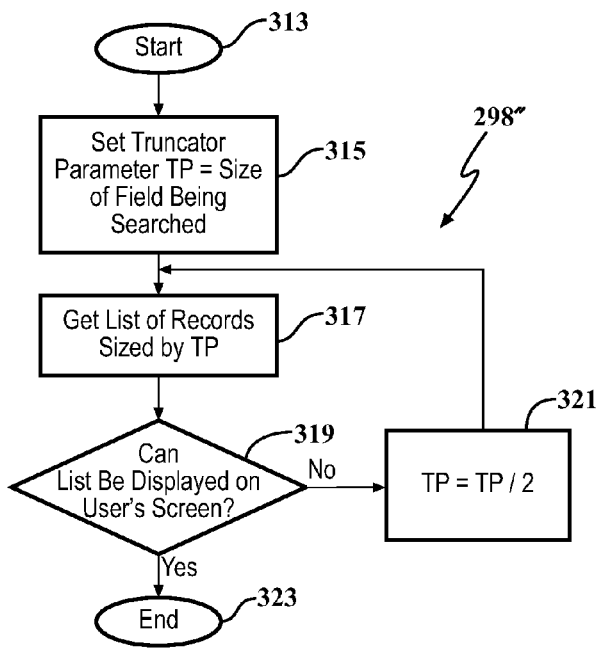
Figure 20:
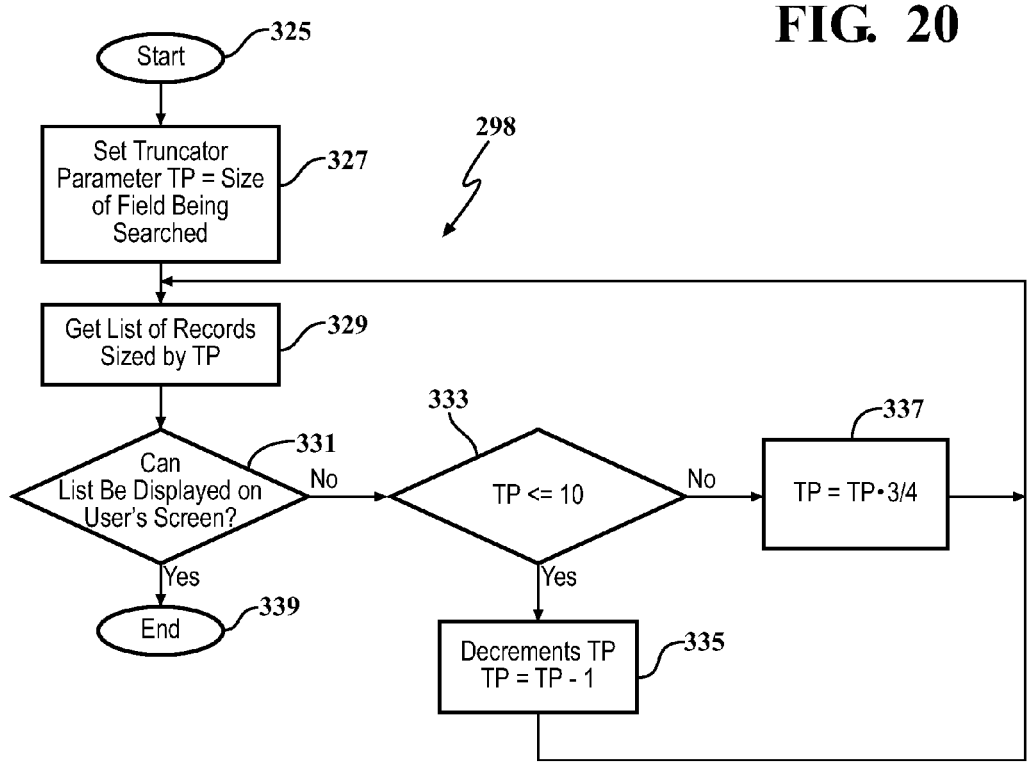

FIGS. 18-20 are flowcharts illustrating alternate truncation subroutines 298. In FIG. 18, the subroutine 298 adjusts a size of a data field by decrementing a parameter TP related to entries in a selected data field. For example, if the data field comprises a list of U.S. cities by name, the parameter TP may be the number of alphabetical characters in a name. The results of such a truncation is shown in the example of FIG. 4. The subroutine 298 starts at block 301. In block 303, the parameter TP is set to equal a size of the data field being searched. The truncator 152 then determines the list of records sized by the parameter TP, block 305. In block 307, the truncator 152 determines if the result list can be displayed at the terminal 14. If the result list cannot be displayed at the terminal 14, the truncator 152 decrements the parameter TP, block 309. Processing then returns to block 305, and the truncator 152 gets a reduced result list using the truncated parameter TP. If the result list can be displayed at the terminal 14, the process moves to block 311 and the subroutine 298 ends.

FIG. 19 is a flowchart illustrating an alternate truncation routine 298'. The process starts in block 313. In block 315, the truncator 152 sets the parameter TP to a size of the data field being searched. In block 317, the truncator 152 determines the list of records sized by the parameter TP. In block 319, the truncator 152 determines if the result list can be displayed at the terminal 14. If the result list cannot be displayed, the truncator 152 adjusts the size of the data field by dividing the parameter TP by a set amount, for example, by dividing the parameter TP by two, block 321. Processing then returns to block 317, and repeats. If the result list can be displayed at the terminal 14, the process moves to block 323 and the subroutine 298' ends.

FIG. 20 shows yet another alternative truncation subroutine 298" The process starts in block 325. In block 327, the truncator 152 sets the parameter TP to equal the size of the data field being searched. In block 329, the truncator 152 determines the list of records sized by the parameter TP. The truncator 152 then determines if the result list can be displayed at the terminal 14, block 331. If the result list cannot be displayed at the terminal 14, the truncator 152 determines if the parameter TP is less than ten, block 333. If the parameter TP is not less than ten, the truncator 152 adjusts the parameter TP by multiplying the parameter TP by a number less than one, block 337. In an embodiment, the number may be ¾. The process then returns to block 329 and repeats. In block 333, if the value of the parameter TP is less than ten, the truncator 152 decrements the parameter TP by one, block 335. Processing then returns to block 329 and repeats. In block 331, if the list can be displayed at the terminal 14, the process moves to block 339 and the subroutine 298" ends.

The examples illustrated in FIGS. 18-20 are but a few examples of the truncations subroutine. One of ordinary skill in the art could conceive of other methods to adjust the field size. In addition to using a truncation subroutine, the user may specify a limit for the field size.

Figure 21:
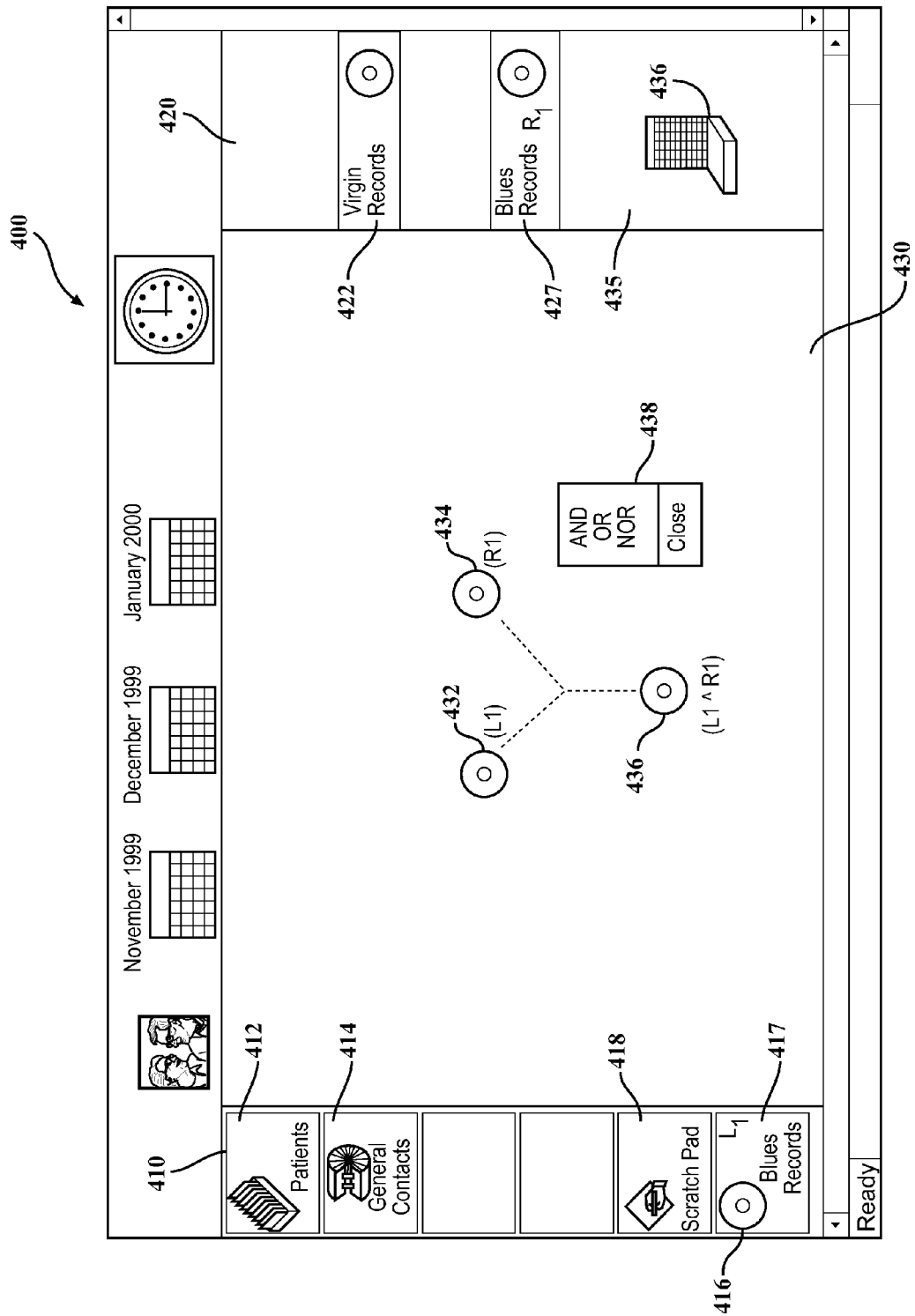
FIG. 21 illustrates a further function of the search engine of FIG. 3 in which results of more than one search are combined.

As noted above, the search engine 125 may be used for multiple searches and may be used to search multiple databases, including databases with different schemas. The results of individual searches, including the control data provided in the status control 140, are saved. The search engine 125 may then be used to further sort (search), or otherwise operate on, the results of these multiple searches. In an embodiment, the search engine 125 may perform a Boolean AND operation on two search results. The result of the Boolean AND operation would be a list of records, or entries, that are common to the two search results. FIG. 21 illustrates such a Boolean AND operation.

In FIG. 21, a GUI 400 displays local database selections 410, including a database of recordings (compact discs—CDs) 412 and a database of contacts 414. The databases 412 and 414 may be shown by text descriptions and an appropriate icon, for example. The database selections in this example are resident on a user's terminal, such as the terminal 14 shown in FIG. 1. Also displayed on the GUI 400 is a remote database selection 420 that represents databases, such as the databases 13 and 15 shown in FIG. 1, that are located remotely from the terminal 14. In the example shown in FIG. 21, the remote database selection 420 includes a database 422 for online record sales, which is represented by an icon (a CD) and a text title of the online retailer. The remote databases shown in the remote database selection 420 may include those databases for which the user has already established a link. In the example shown, the user may already have entered an Internet address for the online retailer. In addition to any returned web pages from the online retailer, the terminal 14 may then display a representation of the database 422.

Continuing with the example, the user may use the search engine 125 to conduct a search-on-the-fly of the recordings database 412 and the Virgin Records.™ database 422. The user may search both databases 412 and 422 for titles of recordings that are classified as "blues." The search engine 125 may return search results 416 and 424 for searches of both databases 412 and 422, respectively. The search results 416 and 424 may be displayed in a window section 430 of the GUI 400. The results 416 and 424 may also be represented by CD icons, such as the icons 432 and 434. The search results 416 and 424 may be stored as lists in one or more temporary databases, as represented by the windows 417 and 427. The search results 416 and 424 may also be stored in a scratch pad database 418. At this point, the user may wish to determine which recordings from the list 424 are contained in the list 416. The search engine may support this function by performing a Boolean AND operation of the lists 416 and 424. The results of the Boolean AND operation are represented by the icon 436 displayed in the window 430. To execute the Boolean AND operation, the user may simply drag the icon 432 over the icon 434, and then select AND from a pop-up menu 438 that appears when the icons 432 and 434 intersect. Other techniques to execute the Boolean AND (or another Boolean function) may include typing in a command in a window, using voice recognition techniques, and other methods. In addition, other Boolean functions may be used.

The result represented by the icon 436 of the Boolean AND operation may then be stored in a database at the terminal 14, such as in the scratch pad database 418 or may be stored at another location. The result may then be subjected to further search-on-the fly operations.

Also shown in FIG. 21 is an online-purchase module 435 that may be used to consummate purchase of a product referenced in an online database such as the database 422. To initiate such a purchase, the user may drag an iconic or text representation of a desired product listed in the search result 424 over an icon 436 in the online-purchase module 435. This drag-and-drop overlaying these icons may initiate and complete the online purchase for the desired product.

Use of the search engine 125 may be facilitated by one or more GUIs that are displayed on the terminal 14. FIGS. 22-26 are examples of such GUIs. In FIG. 22, a GUI 450 includes a display section 452 and one or more database sections such as local database section 470 and remote database section 460. The local database section 470 includes databases local to the terminal 14. In the example shown, the local databases include a patients database 472, a general contacts database 474, a pharmacy database 476, a medicines database 478 and a scratch pad database 480. The remote databases include an Amazon.com database 462, an online record retailer database 464, a Physician's Desk Reference database 466 and an American Medical Association (AMA) online database 468. The remote and local databases may be represented by a text title and an icon, both contained in a small window as shown. A user may access one of the remote or local databases by moving a cursor over the desired window and then selecting the database. In the example shown, the local medicines database 478 has been selected, and a list 490 of data fields in the medicines database 478 is displayed in the display section 452. Also included on the display section 452 is a keyword button 492 that may be used to initiate a key word search of the medicines database 478.

Figure 23:
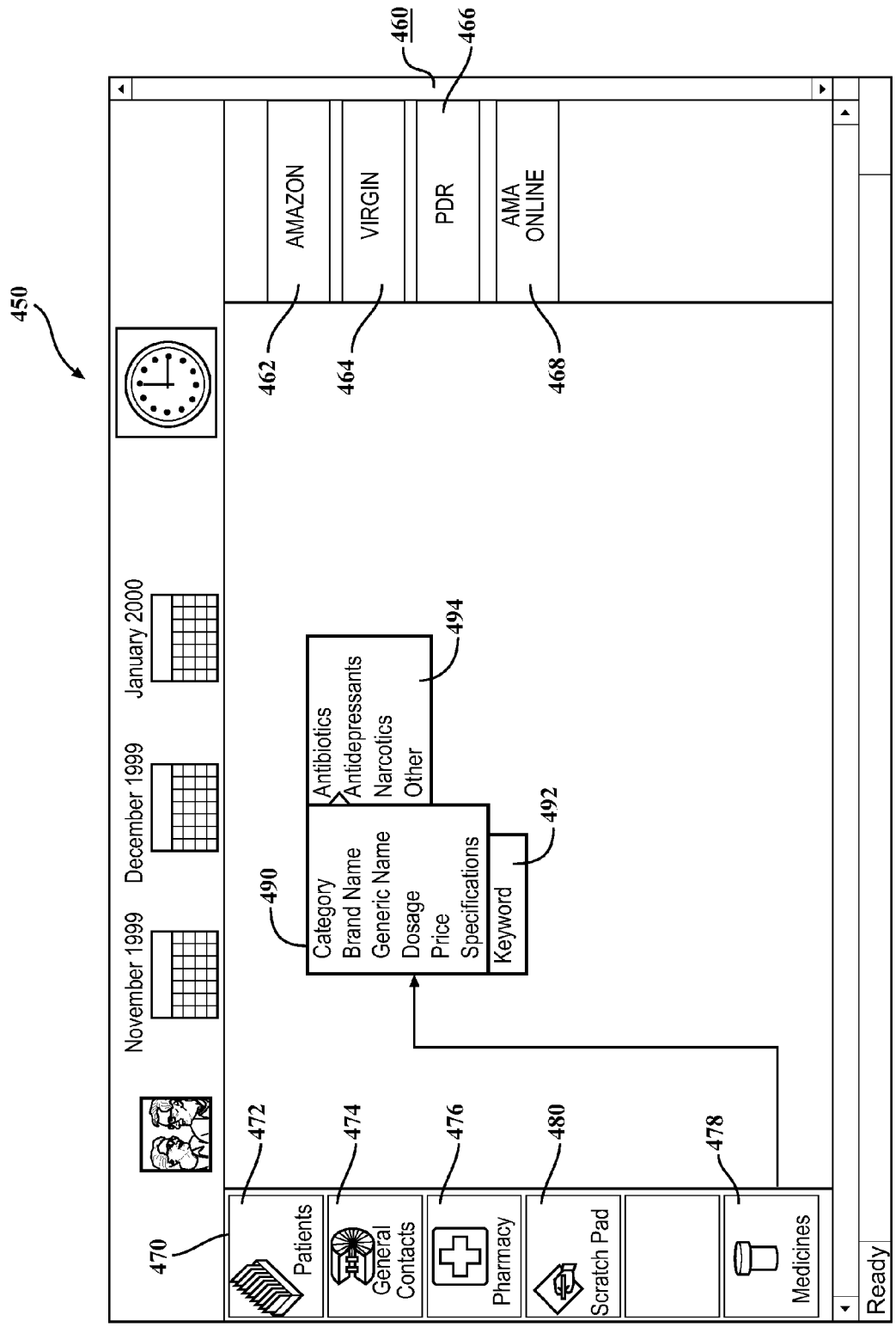

FIG. 23 shows the GUI 450 with a user selection of a category data field from the list 490. The category data field is indicated as selected by an arrow adjacent to the data field name. When the category data field is selected, a category list 494 is displayed on display section 452. The category list 494 includes four entries, as shown.

Figure 24:
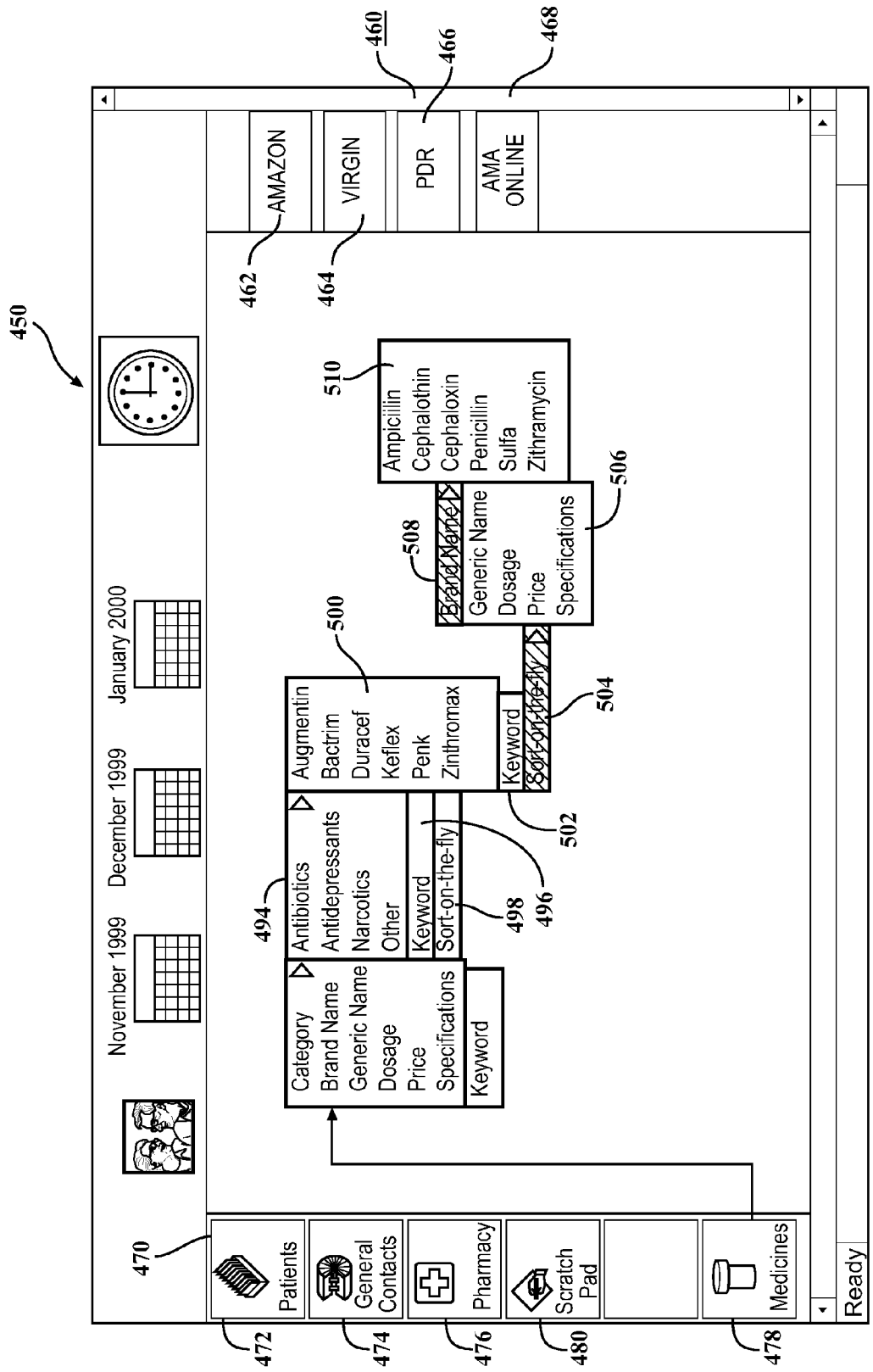

The user may continue to search the medicines database 478 using key word techniques and search-on-the-fly techniques. FIG. 24 shows the GUI 450 with results of several search cycles displayed.

Figure 25:
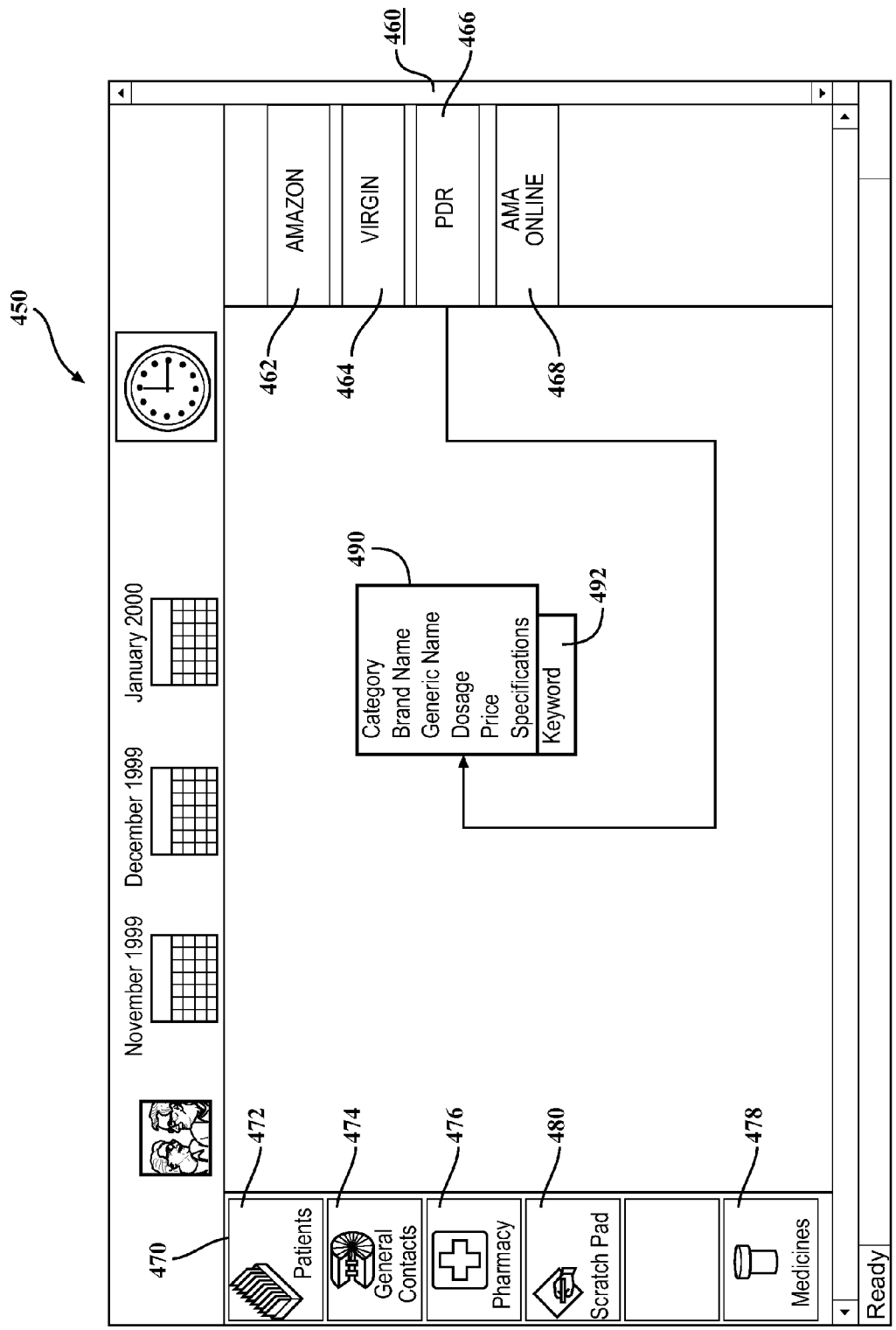
Figure 26:
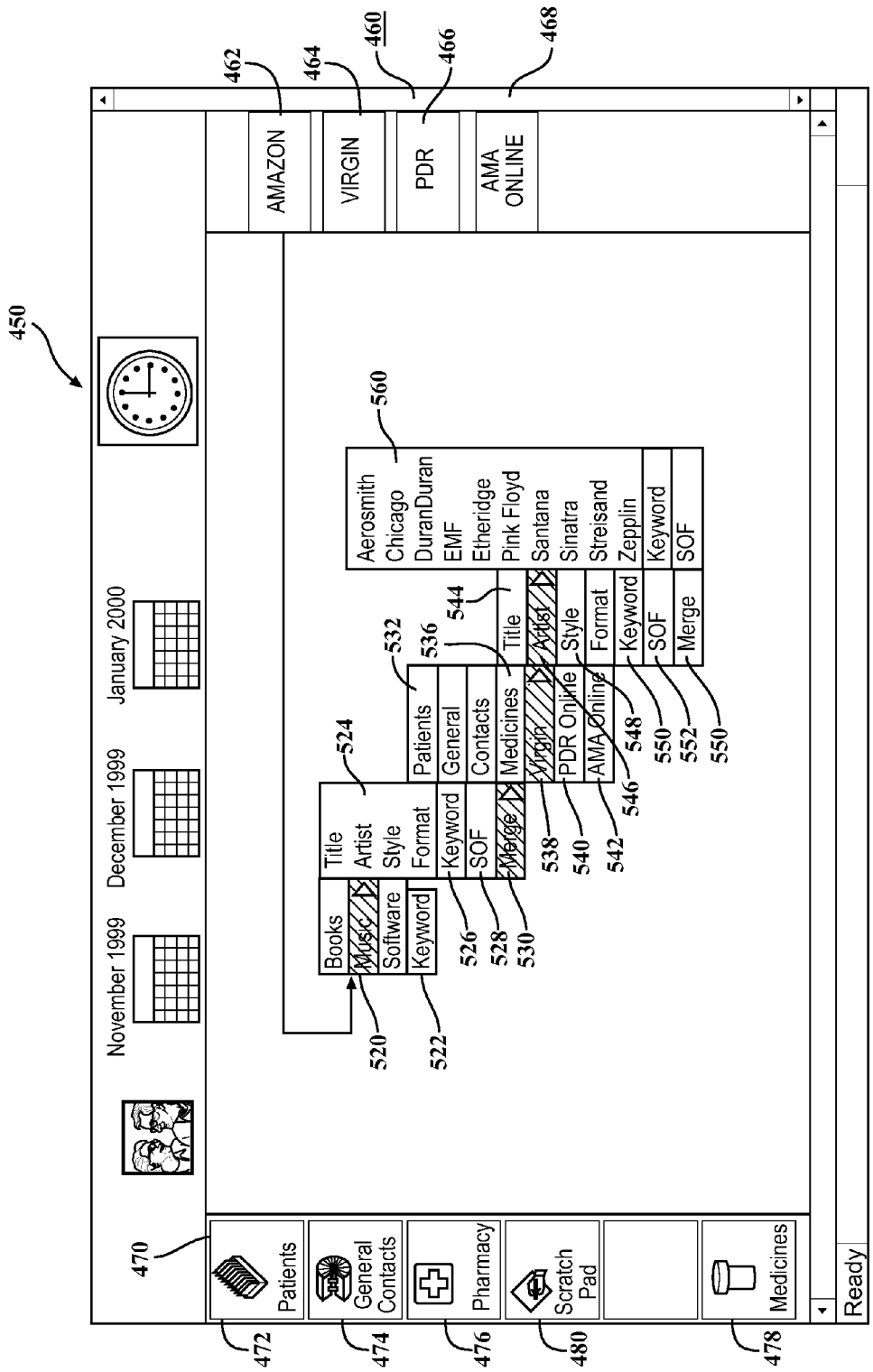

FIG. 25 illustrates a search of the PDR database 466. Such a search may be initiated by dragging a cursor to the window having the PDR 466 symbol (text or icon), and then operating a "select" button. FIG. 26 shows a search of the Amazon database 462. This search may also be initiated by a "drag-and-drop" operation.

The SOF search engine 125 may accommodate merging of one or more sets of search results. The multiple search results may be derived from a common database, or from more than one database. A search using the search engine 125 may be controlled through a user interface by one or more icons that can represent (1) filters or (2) the images of filters. Thus, the icon may represent spatial or temporal attributes, or sets of objects or procedures. Merging the icons thus has two interpretations corresponding to (1) and (2): either filters are added ("apply every filter in every icon to every image to which it can be applied"), or image sets are added. In an alternative embodiment, the addition (union or join) operator may be any other relational operator, e.g. divide, difference.

In various aspects, the SOF search engine 125 provides many unique and powerful database operations. These operations in data manipulation that involves chirality; faceted search and facet manipulation; including facet rotation, dynamic data functions, including database content exposition involving, for example, dynamic pull down menus, data rotation; taxonomy control, variation, and biasing; database and database cleansing; data visualization; data parsing, re-amalgamation, retagging, and database repopulation; and diverse data mining operations. The SOF search engine 125 provides an intuitive computer-human interface that matches the unique parallel processing of the human brain and the rapid serial processing of a digital computer. These aspects of the SOF search engine 125 make possible many additional features and information display and data manipulation products and services, including data representation and manipulation through icon combinational variance, not available with current database management systems and concepts. These aspects of the SOF search engine 125 are disclosed above, and are shown in FIGS. 22A-31 and are explained in more detail below.

Chirality

The SOF SE 125 allows for chiral manipulation of data objects. A human left hand has a chiral representation to a human right hand. When closed, the left hand is a non-superposable mirror image of the right hand; no matter how the two hands are oriented, it is impossible for all the major features of both hands to coincide. Chiral manipulation of data objects using SOF SE technology may be understood with reference to FIGS. 22A-22C.

As noted above, GUI 450, shown for example in FIG. 22B, includes a display section 452 and one or more database sections such as local database section 470 and remote database section 460. The local database section 470 includes databases local to the terminal 14. In the example shown, the local databases include a patients database 472, a general contacts database 474, a pharmacy database 476, a medicines database 478 and a scratch pad database 480. The remote databases include an Amazon.com database 462, an online record retailer database 464, a Physician's Desk Reference database 466 and an American Medical Association (AMA) online database 468. The remote and local databases may be represented by a text title and an icon, both contained in a small window as shown. A user may access one of the remote or local databases by moving a cursor over the desired window and then selecting the database. In the example shown, the local medicines database 478 has been selected, and a list 490 of data fields in the medicines database 478 is displayed in the display section 452. Also included on the display section 452 is a keyword button 492 that may be used to initiate a key word search of the medicines database 478. Thus, the illustrated databases are represented in GUI 450 by a number of different icons.

The icons of GUI 450 are data objects. Manipulation of the icons illustrates the chiral nature of their data representation. For example, the patients database 472 is represented by an address card file icon 472A. Pharmacy data base 476 is represented by a pharmacy icon 476A. Medical database 478 is represented by medical icon 478A.

Dragging the patients database icon 472A over the pharmacy icon 476A (path A, FIG. 22B) instructs the SOF SE 125 to execute a first operation. Dragging the pharmacy icon 476A over the patients database icon 472A (i.e., path B, FIG. 22C) instructs the SOF SE to execute a second operation. In this example, the first operation (FIG. 22B) may be to produce a database listing 476B of all medicines currently prescribed (i.e., prescriptions) to each of the patients in the database 472. The database listing 476B may include full or partial patient information as provided in the patients database 472. The database listing 476B further may include a full or partial listing of the prescriptions as contained in the pharmacy database 476. The full or partial listing from the pharmacy database 476 may include information such as prescription date, expiration, refills, generics, and pharmacy information including pharmacy contact information and pharmacist name. The SOF SE 125 further may select icon 476C to represents the database listing 476B. The database listing 476B and icon 476C may be stored in a local data repository such as the virtual scratch pad database 480, and may be displayed on the GUI 450 as separate database 476B. The icon 476C and its underlying database 476B may be used in subsequent search-on-the-fly operations, such as sending a new prescription for a particular patient to a pharmacy (after appropriate medical examination and review by the prescribing physician).

Figure 22A:
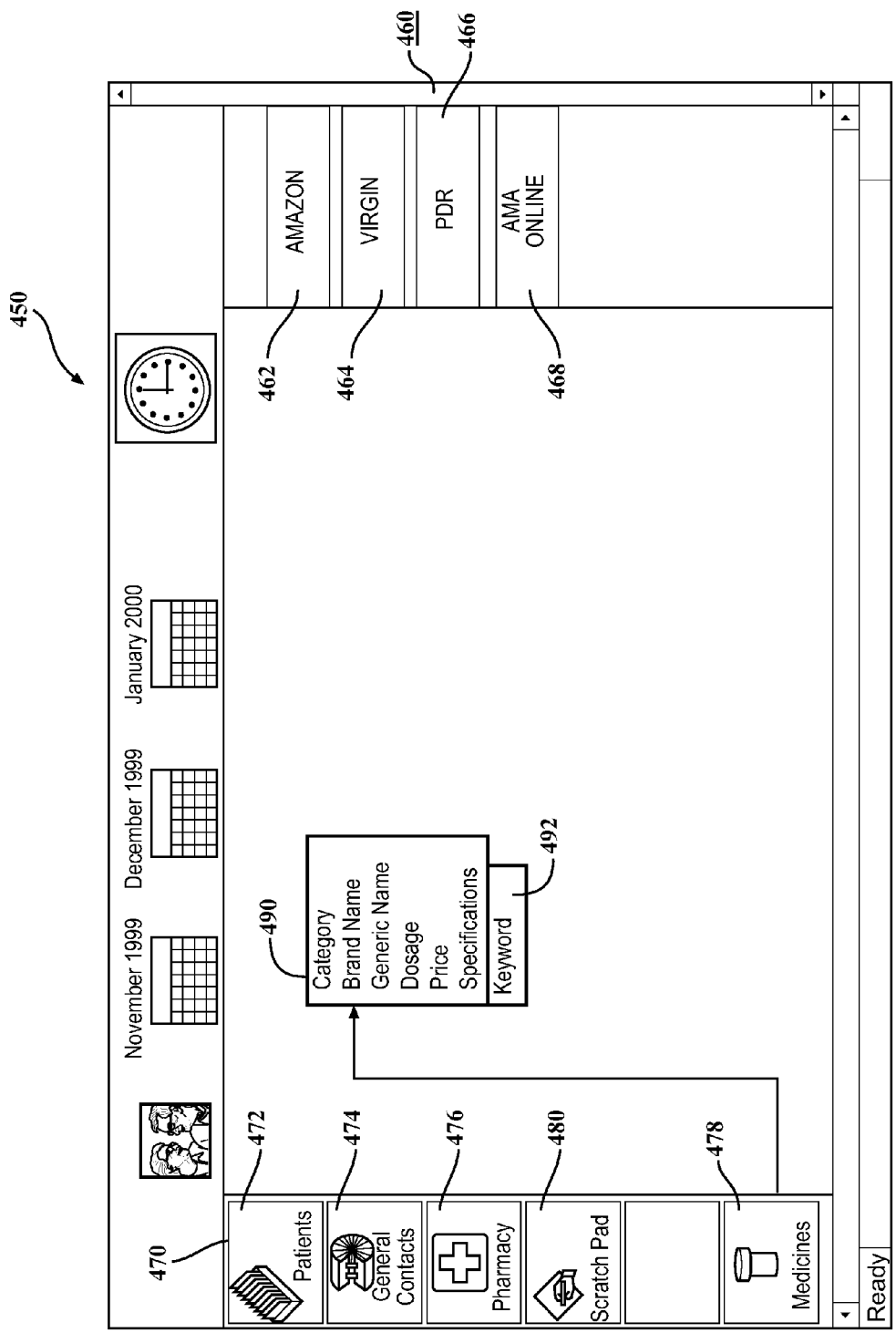
FIGS. 22A-26 illustrate graphical user interfaces that may be displayed in conjunction with operation of the system of FIG. 1.
Figure 22B:
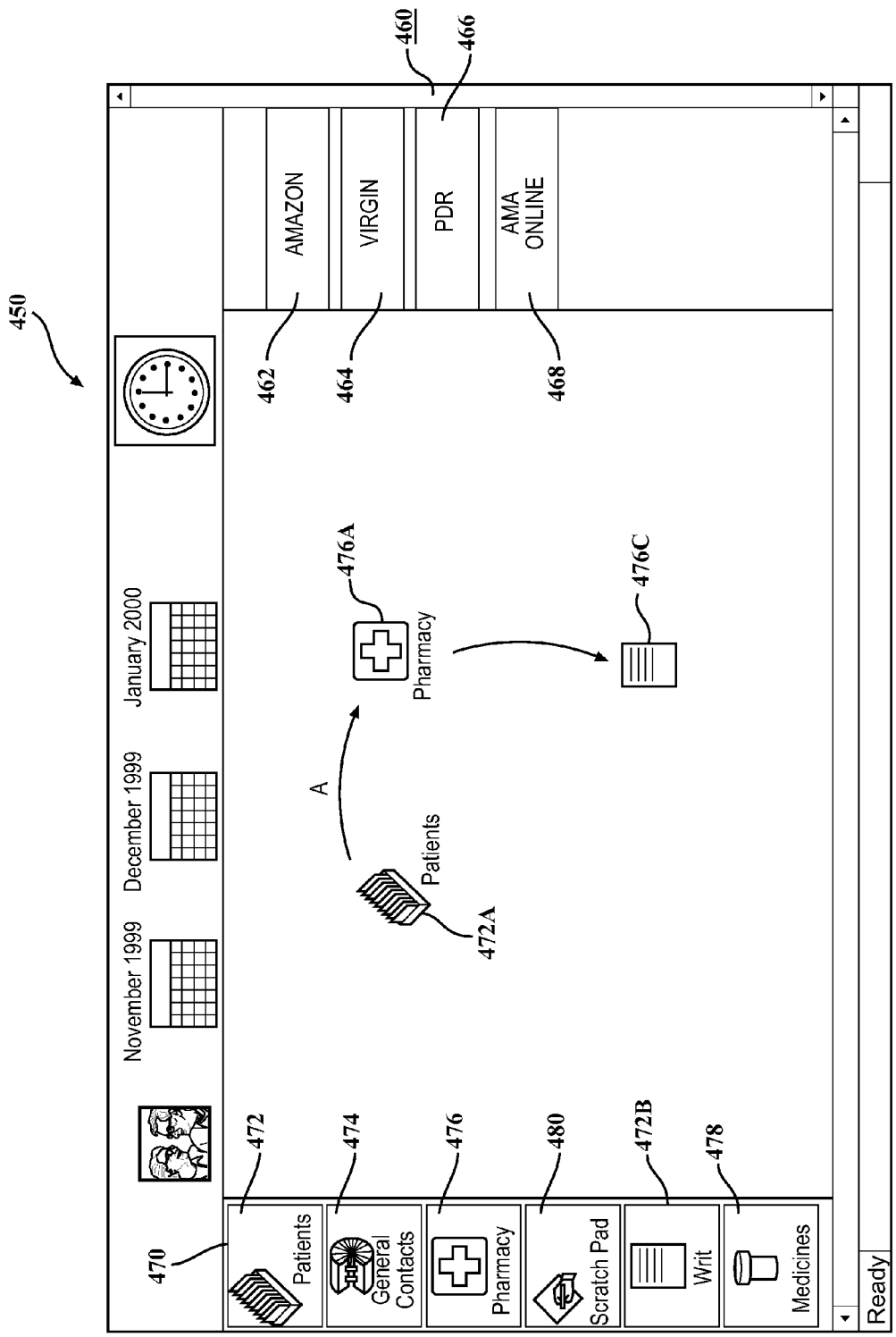
Figure 22C:
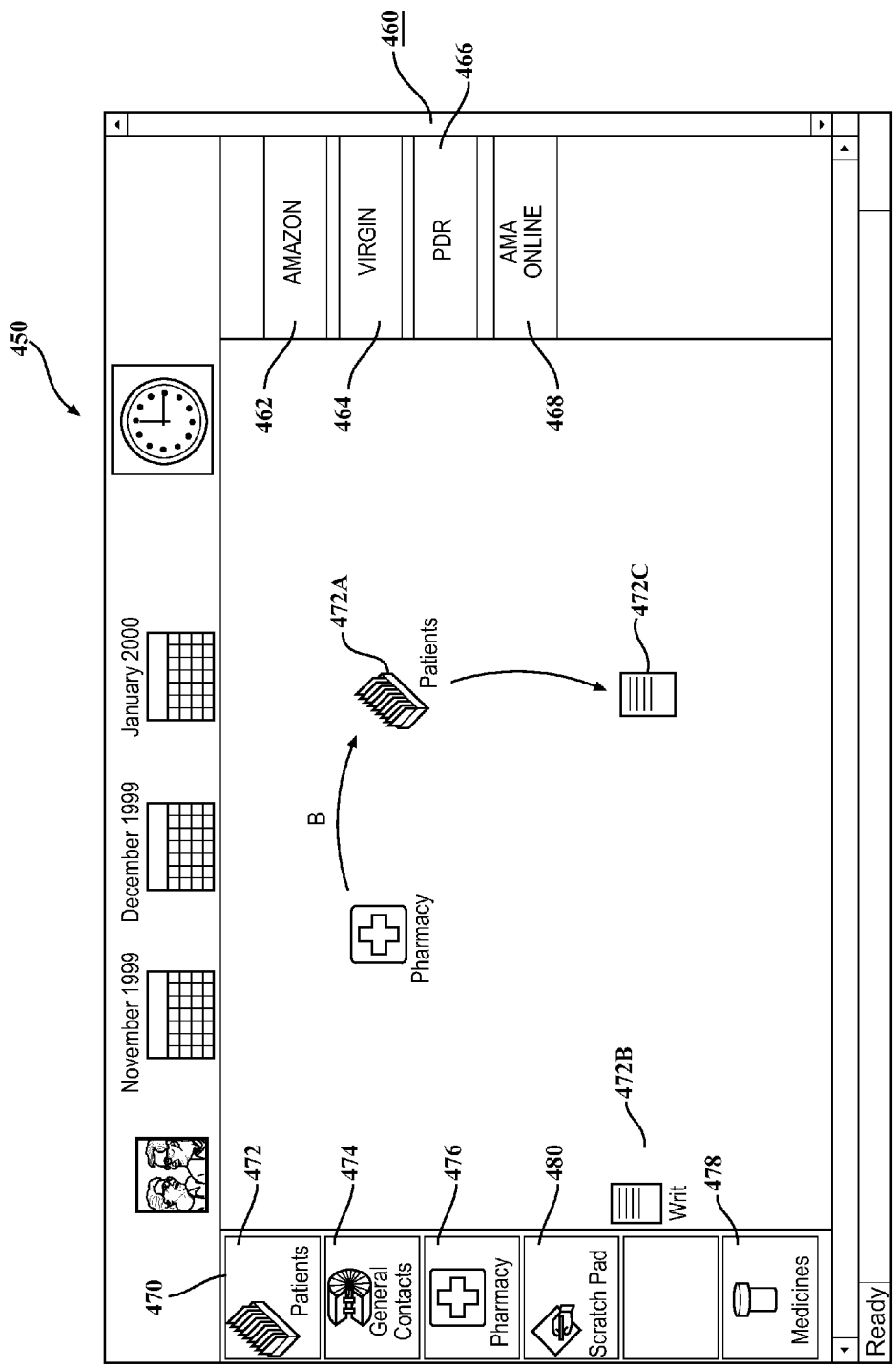

Referring to FIG. 22C, icon merge and database manipulation process of path B involves dragging the pharmacy database icon 476A patients database icon 472A may send a prescription to a patient's preferred or designated pharmacy. A physician, during the course of a day's medical examinations, for example, may require several prescriptions, which the physician may enter into the pharmacy database 476. By dragging the pharmacy database icon 476A over the patients database icon 472A, the physician may send an appropriate prescription, in the form of a digitally-signed electronic document resembling a hard copy prescription writ. This dragging operation of path B also may send a prescription drop-off notification to the patient using email, text, or voice messaging. The icon merge operation may produce database listing 472B, which may take the form of prescription information for the patient. The database listing 472B may be accompanied by icon 472C, which may be in the form of a prescription writ. The database listing 472B and icon 472C may be stored in the virtual scratch pad database 480, for example.

As may be appreciated by reference to FIGS. 22A-22C, an icon merge operation along path A produces different results from those of an icon merge along path B, illustrating the chiral nature of icon merge operations executable using search-on-the-fly technology. This chirality may be a default condition established with the construction of the underlying databases. In an alternative, a user may establish chiral merge operations through use of an appropriate GUI.

Faceted Search

Search-on-the-fly technology, as disclosed herein, permits a rich-exposition of data from any database or merge of multiple databases. In viewing a database, the database fields generally are shown as a flat, two-dimensional structure; namely a page or sheet of paper. However, using a SOF search engine 125, this ordinary representation of data may be enhanced significantly to show all the rich variation of data possible in a faceted search. Rather than the "sheet of paper" view of data, the SOF search engine 125 may be used to present the data in one of a number of facets of a solid object. Consider a database that has six dimensions. Referring to FIG. 24, medicines database 478 may be seen to have six dimensions, namely Category, Brand Name, Generic Name, Dosage, Price, and Specifications. That is, using the SOF search engine 125, an iterative search of the database 478 may be conducted starting with any of these six dimensions. FIG. 24 shows just such a search. As a first dimension, Category, is selected, sub-categories are revealed, namely Antibiotics, Antidepressants, Narcotics, and Other. The iterative search results 494, 500, 506, and 510 show the effect of applying the SOF search engine 125 to the medicines database 478.

Figure 27:
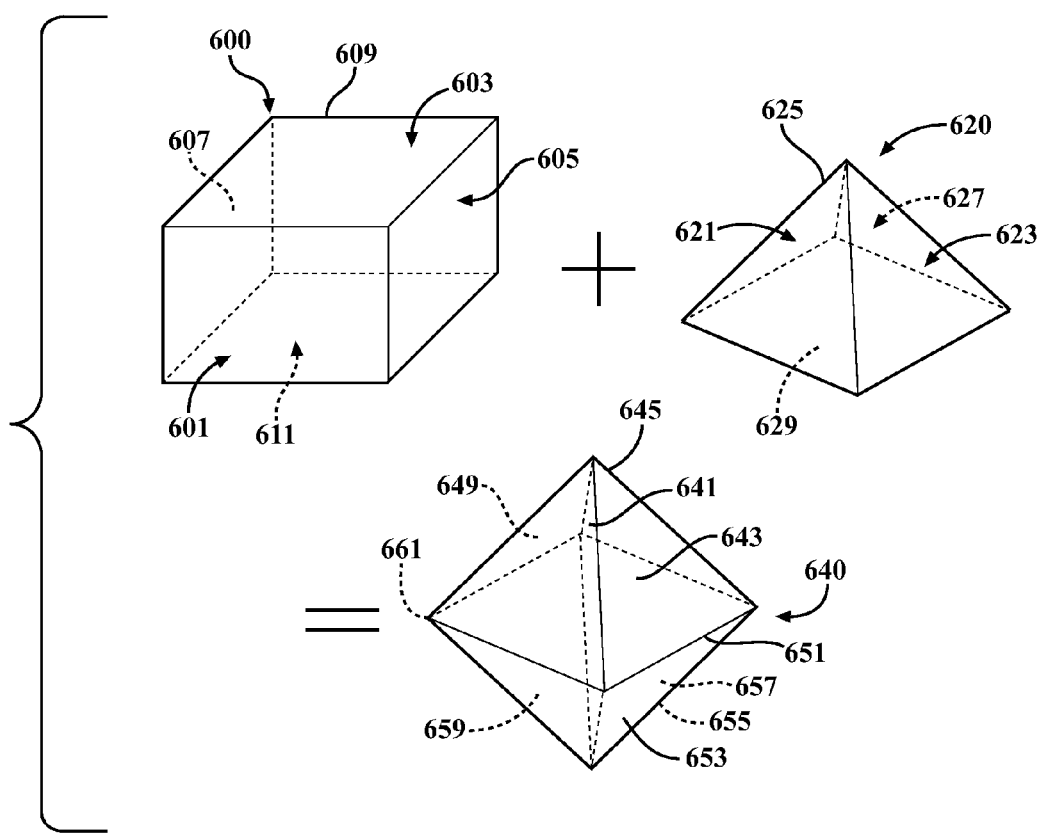
Figure 28:
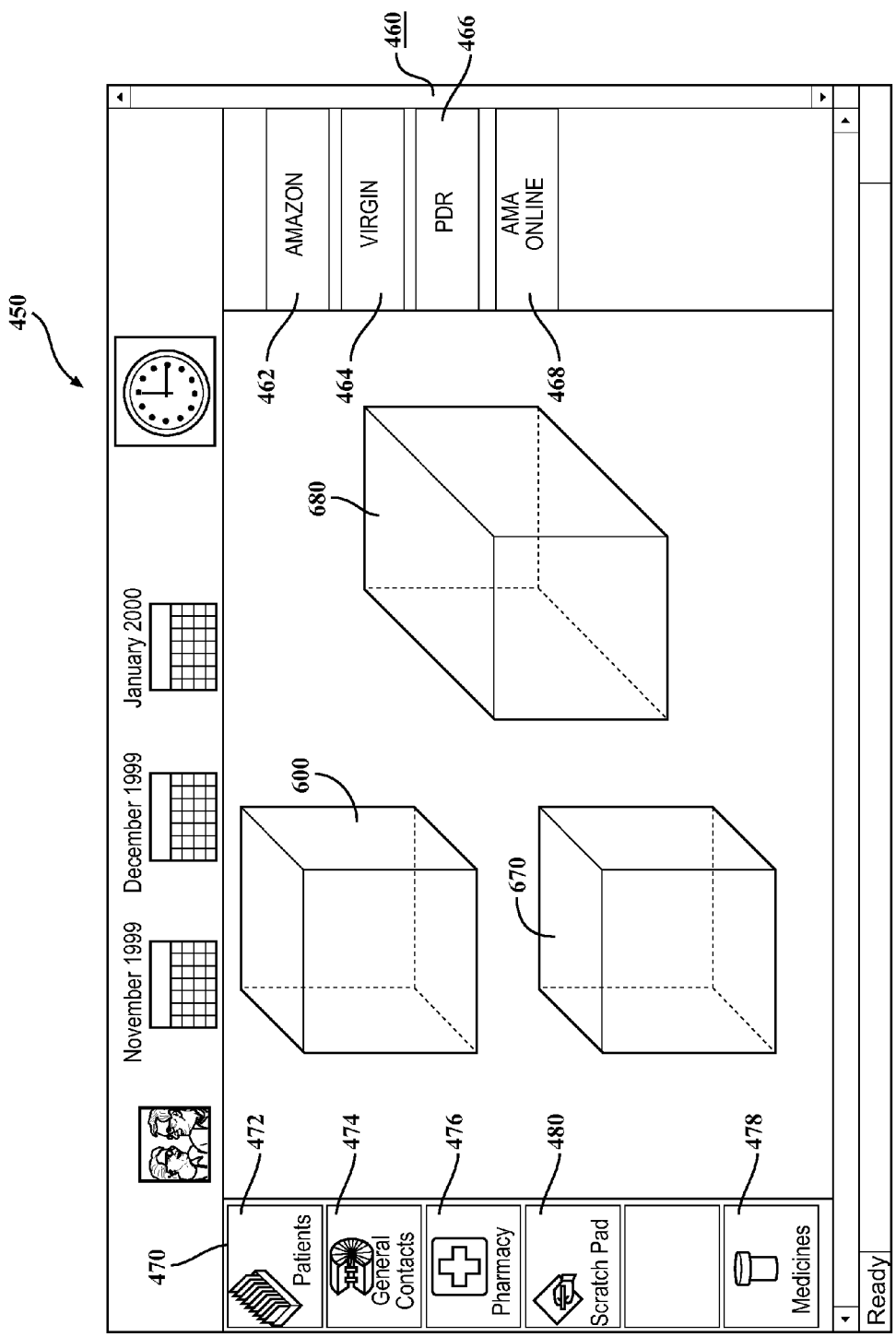

However, even more information is available using the power of the SOF search engine 125. Consider now how the original six dimension would appear if expressed in a solid, or body of revolution. For six dimensions, such a solid, with equal sized facets, would be a cube. The SOF search engine 125 may render the database 478 on the GUI 450 as a cube, with each dimension occupying a facet of the cube. FIG. 27 shows such a rendering. The SOF search engine enables rotation of the cube to allow a user to view the contents of each facet or dimension of the cube 600.

Note that any facet of the cube may display further search results when a search on any one dimension is conducted. Note also that if the contents of any database would exceed the display capacity of a facet, the results may be truncated. Thus, and considering the search results shown in FIG. 11, for example, the selection of Title for the next iteration of an iterative search returns too may results to be entirely shown, as can be seen in results field 234. Thus, the SOF search engine 125 may return a truncated list of titles, and further iterative searches may result in truncation until the results may be displayed in a facet without truncation.

As an alternative, the SOF search engine 125, when displaying search results in the graphical form of a faceted solid, may resize the solid when the results of a search iteration produce a smaller number of entries in a facet than existed before the search. That is, the cube may shrink. Correspondingly, the cube may expand when the number increases.

As another alternative, each iteration of the search may produce a unique cube, smaller or larger in size than its predecessor. Thus, a search with three iterations may produce three cubes, each of which may be displayed in the GUI, and each of which may differ in size from the others. See FIG. 28.

The SOF search engine 125, and associated search technology, then, may be used to create any shape with any number of facets. The solid (image) produced by this process takes on an appearance similar to that of a soccer ball, with facets for panels of the ball, when the number of database dimensions increases. Each such facet, or panel of the solid is an entry point into the overall database or data structure represented by the solid. The solid may be manipulated by "reaching in" to a specific facet and "viewing by" the data as shown, for example, in a flat view, by FIG. 24.

Figure 29:
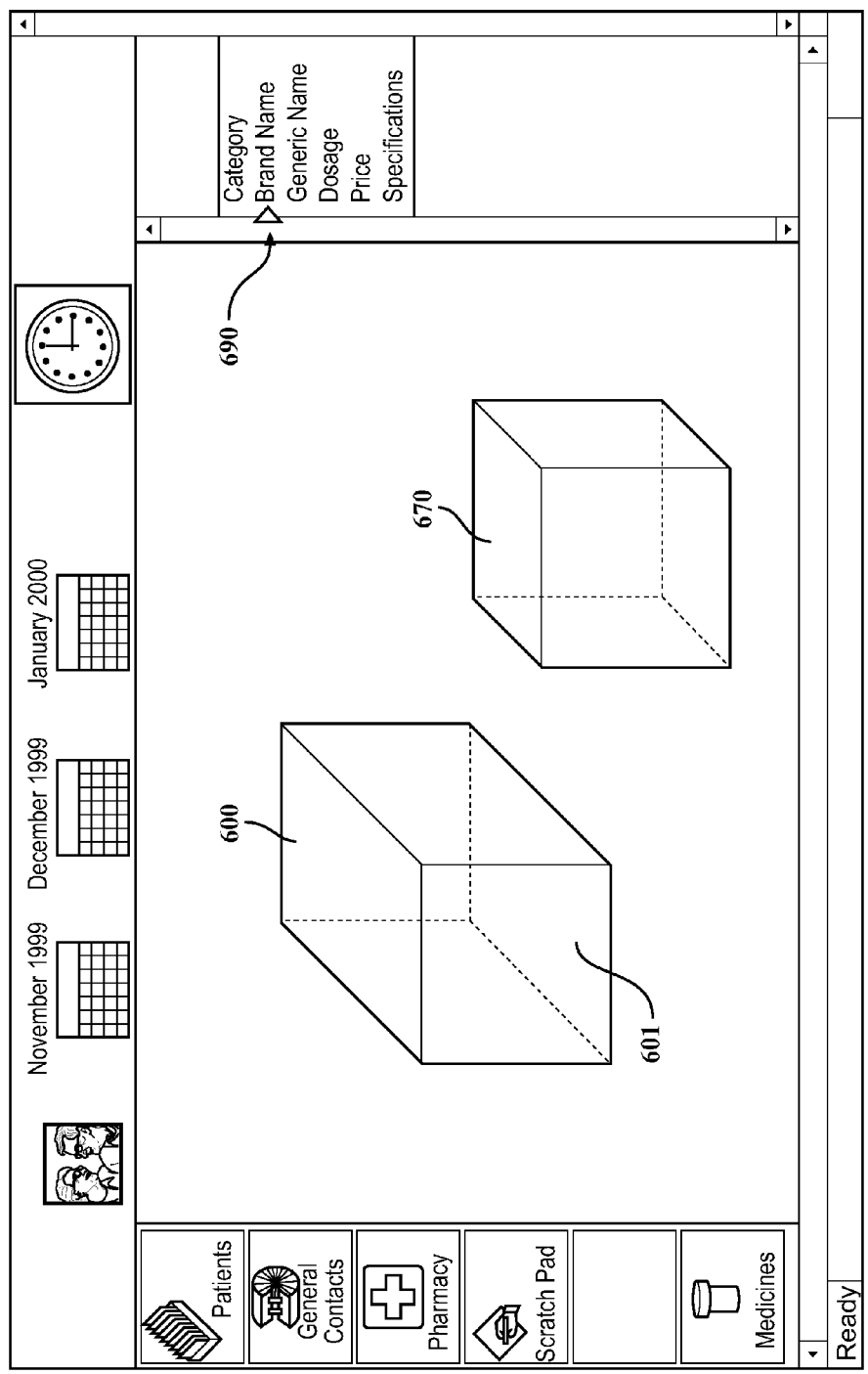

As is shown in FIG. 29, the GUI 450 includes a control feature that allows manipulation of the cube(s). For example, a user may hover a cursor (not shown) over a cube to select that cube, and then by operation of slide bar 690, may rotate the cube so that the selected facet is displayed in a plane of the GUI. Thus, as shown, facet 601 of cube 600 is in the plane of the GUI 450.

Another powerful aspect of the SOF search engine 125 is the ability to merge databases, data sets, data dimensions, and data in an intuitive fashion that convey the rich power of search-on-the-fly technology. Consider databases 476 and 478, shown in FIG. 28. Database 476 has six dimensions, and as before, may be represented by a cube 600. Database 478, however, has five dimensions and may be represented as a pyramid. However, database 478 has two data dimensions that do not exist in the database 476, namely health warning issued by the drugs' manufacturers, and shelf life. A user may be interested in of merging the two databases 478 and 476. FIG. 27 shows the result of the merge, namely an eight-sided solid 640. In addition, for overlapping entries in a specific data dimension, the overlap may be indicted by one color, such as blue, and the non-overlapping entries by two other colors, such as green and red, to indicate the origin of the entries. As before, the GUI 450 may incorporate control features that allow "rotation" of the displayed solids.

In addition to the above-disclosed features, a solid such as the eight-sided solid of FIG. 27 may be "unfolded" to produce a more traditional view of the data—for example, FIG. 24. In unfolding the solid, the order of steps in any iteration, if represented in the solid, may be reflected in the unfolded view.

In addition to the above-described control features, the GUI 450 may incorporate touch screen displays, and the solid may be rotated along an infinite number of axes, much like spinning a globe or rolling a ball.

Dynamic Pull Down Menu

The SOF search engine 125, as disclosed previously, produces dynamic search results. Referring again to FIG. 24, a search of medicines by category produces a list of three drugs, plus "Other." This list is dynamic, and constitutes a dynamic pull-down menu for further searching and selection. The list is dynamic in that the SOF search engine 125 may return results only if the underlying database contains an enumerated item. Thus, for example, if the database 478 does not contain any antibiotics, the result list 494 would not have the entry "Antibiotics." This effect has significant consequences. The absence of an entry means the database has no instances of the data item. Thus, a user may, by simple inspection, determine the entire breadth of coverage of a database by noting what is shown in a search result field and what is not shown.

Note that this feature applies to all databases accessible by the SOF search engine 125. In FIG. 24, the illustrated SOF search is of the medicines database 478. However, the SOF search engine 125 may be controlled to search any or all of the external database shown in section 460, as well as those shown in section 470. The SOF search engine 125, in returning search results may include data entries from all appropriate databases resident on, or linked to terminal 14. For example, the SOF search engine 125, when searching all databases for the term antibiotics, may search the databases 476, 478, and 466, 468.

Parse/Amalgamate/Re-Label/Repopulate

The SOF search engine 125 permits powerful data parsing and re-labeling, and database repopulation. Consider the data search results shown in FIG. 30. Under results, Attorney (705), a number of individual attorney names and firm names are listed (since the truncated term "Dor" was selected in the prior iteration). The Attorney results list 705 for "Dor," in effect, could be a database, database dimension, or field. However, only names beginning with Dor are shown. As a result, the name "Herell," which appears as the second name in the second entry may not be separately searchable. However, the entries in the Attorney field 705 may be parsed to separate out any definable data element. For example, the firm names may be parsed according to each proper name, first and second names appearing in the firm name, the "&" symbol, the word "and," and if listed, the corporation type (e.g., PLLC, PLC, etc.) The thus-parsed data elements could then be amalgamated. Suppose a user were interested in the corporate designation. The data may be parsed to break out this term, where existing. The corporate designation then may be formed as a separate data dimension and may be labeled as "law firm corporation type." Then the database may be repopulated with this data element. Subsequent searches of the database may include a search-on-the-fly search for lay firm corporation type.

Data Cleansing

A powerful feature of search-on-the-fly searching is the ability of the SOF search engine 125 to explicitly and clearly show errors and inconsistencies in any database. Consider the search results shown in FIG. 31 for the USPTO database with assignee name as a search term. Iterative searching leads to results of "M" and then "Minnesota Mining and Manufacturing Company." The returned search results clearly show the inconsistent nature of entries for this assignee. Of course, inconsistent entries may not result in actual errors. However, if the assignee name were spelled with one "n" in Minnesota, the entry would be outside the range of actual, correct assignee names for 3M. But the graphical nature of SOF search engine search results would place the erroneous result within the same window as the correct results, and thus, the erroneous result may be noticed by a user reviewing the search results. Thus, the error may be detected.

Once detected, the user need only select the erroneous entry and a correct entry, and with a single 'cleanse" command, correct the error the SOF search engine 125 performs a merge of the two data entries and replaces the erroneous entry with a correct entry.

Virtual Scratch Pad

A virtual scratch pad allows a user to maintain data in a convenient, easy to access, review, and manipulate area of the terminal 14. Virtual scratch pad database 480 is illustrated, for example, in FIG. 22A. The virtual scratch pad database may be an amalgamation of databases, database search results, and similar data. The virtual scratch pad database 480 may contain data for a limited time, or until deleted by a user. The virtual scratch pad database 480 may include data searchable together by the SOF search engine 125. For example, the virtual scratch pad database 480 may include search results for several different searches of the PDR database 466. Searching the virtual scratch pad database 480 may mean searching on the fly, the search results as if the results were amalgamated into a single list.

While using search on the fly has been described in detail for an end result of printing, viewing or displaying data, search on the fly can be useful for other purposes. Search on the fly does not require obtaining the underlying data in the database or the display of the underlying data to be useful. Search on the fly can be used for gathering information or characteristics about data in a database with or without downloading the data itself. This gathered information about the data can be used to analyze the data, sorting, correct or clean data, verifications and confirmations. For example, search on the fly can be used to determine whether there is existing data in a database within certain ranges or parameters (date ranges, numerical, alphanumerical and other characteristics). If there is data within certain parameters, the number of datapoints within those parameters can also be determined. This information about the data can be gathered using search on the fly with queries to the database manager (which may simply need to query its index and not access the data itself). Another example is correcting data. Data may need to be corrected or cleaned for various reasons including spelling errors. Search on the fly can locate these errors without necessarily accessing and downloading the data itself. Certain combinations of characters or truncations will be obvious spelling errors. Also, data that is out of range can be located and corrected or eliminated from the database using search on the fly. Another example is data from one database can be confirmed or verified against data in a second database using search on the fly. Those skilled in the art will find many uses and specific applications for search on the fly.

Certain of the devices shown in the herein described figures include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying descriptions to illustrate the embodiments represented in the Figures. The disclosed devices, components, and systems contemplate using or implementing any suitable technique for performing the steps illustrated. Thus, in the Figures, the described or similar steps may be performed at any appropriate time, including concurrently, individually, or in combination. In addition, many of the steps in the flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The terms and descriptions used herein are set forth by way of illustration only and are not meant as limitations.

Those skilled in the art will recognize that many variations are possible within the spirit and scope of the invention as defined in the following claims, and there equivalents, in which all terms are to be understood in their broadest possible sense unless otherwise indicated.

I claim:

1. A method for searching and manipulating data using a search-on-the-fly search engine executed by a processor, the data in a first database represented by a first icon and a second database represented by a second icon, the method, comprising:
   the processor receiving a search request for a data element in the first database;
   the processor returning the data element;
   the processor responding to a first manipulation of the first and second icons, comprising:
      detecting a first move of the first icon over the second icon,
      identifying the first move as a first search request,
      the processor executing a first search operation in response to the first search request, and
      providing a first search result; and
   the processor responding to a second manipulation of the first and second icons, comprising:
      detecting a second move of the second icon over the first icon,
      identifying the second move as a second search request,
      the processor executing a second search operation in response to the second search request, and
      providing a second search result different from the first search result.

2. The method of claim 1, further comprising displaying the first and second search results in a user interface.

3. The method of claim 1, wherein the first search result includes a first online operation and the second search result includes a second online operation, the method further comprising:
   the processor executing the first online operation; and
   the processor executing the second online operation.

4. The method of claim 3, wherein the processor automatically executes the first and second online operations.

5. The method of claim 3, wherein the processor presents a menu of selectable action items for execution.

6. The method of claim 1, further comprising merging the first and the second databases, comprising:
   identifying first data fields of the first database, the first data fields comprising first data field descriptors, each of the first data fields including a plurality of first data elements;
   identifying second data fields of the second database, the second data fields comprising second data field descriptors, each of the second data fields including a plurality of second data elements;
   identifying overlapping first and second data fields based on the first and second data field descriptors;
   combining overlapped first and second data fields, comprising:
      combining first and second data elements of the overlapped first and second data fields; and
   saving the combined first and second data fields as a merged database.

7. The method of claim 6, further comprising:
   representing the first database as a first faceted virtual object having N facets, each of the N facets identified by a first data field descriptor;
   representing the second database as a second faceted virtual object having M facets, each of the M facets identified by a second data field descriptor; and
   representing the merged database as a merged, faceted virtual object having O facets, where O equals the union of N and M.

8. The method of claim 7, wherein the first and second faceted virtual objects are flat displays.

9. The method of claim 7, wherein the first and second faceted virtual objects are virtual solids.

10. The method of claim 7, further comprising displaying the virtual objects in a user interface.

11. The method of claim 10, further comprising:
   identifying inconsistent data elements in the first data elements, comprising:
      displaying the first data elements in the user interface, comprising:
         displaying inconsistent first data elements in a first window of the user interface, and
         displaying correct first data elements in the first window;
      receiving an identity of an inconsistent first data element and an identity of a correct first data element;
      receiving a data cleanse command; and
      correcting the inconsistent first data element to match the correct first data element.

12. The method of claim 11, wherein the inconsistent first data element is an erroneous first data element.

13. The method of claim 6, wherein one or more of the first and second data elements comprises parseable data subelements, the method further comprising:
   parsing the data subelements;
   generating new data fields for the parsed data subelements; and
   storing the new data fields as one of new first and new second data fields.

14. The method of claim 6, wherein the first database is stored on a first media device and the second database is stored remotely from the first media device.

15. The method of claim 6, wherein contents of the first and second databases are displayed in a user interface of a terminal, the method further comprising:
   for each of the first data fields, determining, respectively, a first size of a number of first data elements;
   for each of the second data fields, determining, respectively, a second size of a number of second data elements;
   determining a capacity of the user interface and the terminal; and
   adjusting the first and second sizes so that each of the first and second data elements are represented in the user interface as displayed in the terminal.

16. The method of claim 1, wherein the first and the second databases are data dimensions of larger third and fourth databases, respectively.

17. A system for searching and manipulating data, the data in a first database represented by a first icon and a second database represented by a second icon, comprising:
   a processor; and
   a computer-readable storage medium containing search-on-the-fly search and data manipulation instruction, wherein the processor executes the instructions to:
      receive a search request for a data element in the first database and return the data element;
      respond to a first manipulation of the first and second icons, comprising:

detecting a first move of the first icon over the second icon, identifying the first move as a first search request, executing a first search operation in response to the first search request, and providing a first search result; and respond to a second manipulation of the first and second icons, comprising:

detecting a second move of the second icon over the first icon, identifying the second move as a second search request, executing a second search operation in response to the second search request, and providing a second search result different from the first search result.

18. The system of claim 17, wherein the first database comprises a data field of a third database and the second database comprises a data field of a fourth database.

19. A data search and manipulation method, comprising:

accessing, by a processor, a first data element of a first data structure, the first data structure represented by a first icon, the first icon displayed in a user interface;

accessing, by the processor, a second data element of a second data structure, the second data structure represented by a second icon displayed in the user interface;

executing, by the processor, a first data manipulation process in response to the first icon dragged over the second icon; and executing, by the processor, a second data manipulation process in response to the second icon dragged over the first icon.

20. The method of claim 19, wherein the first data manipulation process comprises executing a purchase process for a product represented by the first data element.

* * * * *